United States Patent [19]

Moriya et al.

[11] Patent Number: 5,304,596
[45] Date of Patent: Apr. 19, 1994

[54] POLYOLEFIN RESIN COMPOSITIONS CONTAINING A CYCLOOLEFIN RESIN AND PROCESSES FOR THE PREPARATION THEREOF

[75] Inventors: Satoru Moriya; Akio Ishimoto; Mamoru Takahashi, all of Kuga, Japan

[73] Assignee: Mitsui Petrochemical Industries, Ltd., Tokyo, Japan

[21] Appl. No.: 704,888

[22] Filed: May 23, 1991

[30] Foreign Application Priority Data

May 25, 1990 [JP] Japan .................. 2-135994

[51] Int. Cl.$^5$ .................. C08L 23/08; C08L 45/00
[52] U.S. Cl. .................................... 525/66
[58] Field of Search .......................... 525/66

[56] References Cited

U.S. PATENT DOCUMENTS

| 3,554,886 | 1/1971 | Colomb, Jr. et al. ............. 525/66 |
| 4,174,358 | 11/1979 | Epstein . |
| 4,918,133 | 4/1990 | Moriya et al. ..................... 524/518 |

OTHER PUBLICATIONS

DATA BASE WPIL, accession No. 86-094470 [15], Derwent Publications Ltd, London, GB; & DD-A-230 828 (VEB LEUNA-WERK) (1986).
DATA BASE WPIL, accession No. 85-196942 [33], Derwent Publications Ltd, London, GB; & DD-A-203 059 (VEB LEUNA-WERK) (1985).
DATA BASE WPIL, accession No. 86-096681 [15], Derwent Publications Ltd, London, GB; & JP-A-61 040 356 (DAINIPPON INK.) (1986).

Primary Examiner—John Kight, III
Assistant Examiner—Jeffrey Culpeper Mullis
Attorney, Agent, or Firm—Sherman and Shalloway

[57] ABSTRACT

Polyolefin resin compositions having a sea and island structure wherein cycloolefin resin, graft modified cycloolefin resin and graft modified elastomer components are finely dispersed in polyamide by melt kneading the cycloolefin resin, graft modified cycloolefin resin, graft modified elastomer and polyamide. Molded products formed by using the polyolefin resin compositions of the present invention are high in impact strength and surface characteristics, particularly less in surface delamination, and also excellent in surface glossiness. The molded products are low in water absorption properties and also excellent in oil resistance.

20 Claims, No Drawings

POLYOLEFIN RESIN COMPOSITIONS CONTAINING A CYCLOOLEFIN RESIN AND PROCESSES FOR THE PREPARATION THEREOF

FIELD OF THE INVENTION

This invention relates to polyolefin resin compositions containing a cycloolefin resin, a graft modified cycloolefin resin, a graft modified elastomer and polyamide and having excellent impact resistance, and to processes for the preparation thereof.

BACKGROUND OF THE INVENTION

Conventionally, polyolefins are known as resins excellent in chemical resistance and solvent resistance. However, when polyolefin is low in crystallinity index, it cannot be said that the polyolefin has sufficient rigidity, heat resistance and solvent resistance.

On that account, there is adopted a process for improving polyolefin in heat resistance and rigidity by the addition thereto of a nucleating agent or a process for enhancing polyolefin in crystallinity index by cooling a molten polyolefin gradually. However, it is hard to say that the effect obtained thereby is sufficient.

Apart from such polyolefins as referred to above, it is reported that copolymers obtained by the reaction of ethylene with bulky monomers are excellent in properties such as heat resistance in comparison with conventionally known polyolefins (see, for example, U.S. Pat. No. 2,883,372 and Japanese Patent Publication No. 14910/1971).

In this connection, on the basis of the acquired information on the fact that cyclic random copolymers obtained by copolymerization of specific cycloolefins as bulky monomers and ethylene are excellent in heat resistance, heat aging characteristics, dielectric characteristics and rigidity, the present applicant has already proposed random copolymers obtained by using specific cycloolefins (see Japanese Patent L-O-P Publications Nos. 168708/1985, 120816/1986, 115912/1986, 115916/1986, 271308/1986, 272216/1986, 252406/1987 and 252407/1987).

On the other hand, an attempt has been made to incorporate other resins into polyamides for the purpose of improving characteristics inherent in polyamides. In spite of various improvements suggested as above, there was much room for further improvement on various characteristics such as water absorption properties, molding shrinkage or heat-resisting rigidity.

OBJECT OF THE INVENTION

The present invention intends to provide, as its object, compositions containing the above-mentioned cycloolefin resin and capable of forming molded articles excellent particularly in mechanical characteristics such as impact strength, and physical properties such as glossiness, solvent resistance and low water absorption properties, and processes for the preparation of said compositions.

More particularly, the object of the invention is to provide, without sacrifice of excellent characteristics of cycloolefin resin, cycloolefin random copolymer-containing resin compositions capable of forming molded articles excellent particularly in mechanical characteristics such as impact resistance, etc., solvent resistance and surface glossiness, and also low in water absorption, and processes for the preparation of said resin compositions.

SUMMARY OF THE INVENTION

The polyolefin resin composition of the present invention is characterized by containing, (a) at least one cycloolefin resin selected from the group consisting of
 (a-1) a copolymer of ethylene and cycloolefin represented by the following formula [I],
 (a-2) a ring opening homopolymer of cycloolefin represented by the following formula [I],
 (a-3) a ring opening copolymer of at least two kinds of cycloolefins represented by the following formula [I], and
 (a-4) a hydrogenation product of the above-mentioned (a-2) or (a-3), (b) a graft modification product of the above-mentioned (a-1), (a-2), (a-3) or (a-4), (c) an elastomer graft modified with an unsaturated carboxylic acid or a derivative thereof and having a tensile modulus at 23° C. of 0.1–2000 kg/cm$^2$, and (d) polyamide, said components (a), (b), (c) and (d) amounting, based on 100 parts by weight of the composition, to 0–59.5 parts by weight, 0.5–60 parts by weight, 2–30 parts by weight and 20–60 parts by weight, respectively;

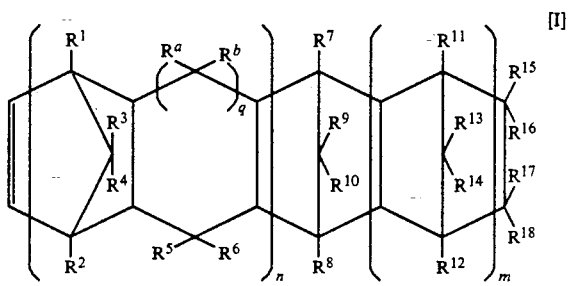

wherein n is 0 or 1, m is 0 or a positive integer, q is 0 or 1, $R^1$ to $R^{18}$, $R^a$ and $R^b$ independently represent an atom or a group selected from the group consisting of hydrogen atom, halogen atom and hydrocarbon group, $R^{15}$ to $R^{18}$ may be bonded together to form a monocyclic group or a polycyclic group which may have double bond(s), and $R^{15}$ and $R^{16}$, or $R^{17}$ and $R^{18}$ may form an alkylidene group.

The process for the preparation of the polyolefin resin composition of the invention is characterized by melt kneading (a) at least one cycloolefin resin selected from the group consisting of
 (a-1) a copolymer of ethylene and cycloolefin represented by the above-mentioned formula [I],
 (a-2) a ring opening homopolymer of cycloolefin represented by the above-mentioned formula [I],
 (a-3) a ring opening copolymer of at least two kinds of cycloolefins represented by the above-mentioned formula [I], and
 (a-4) a hydrogenation product of the above-mentioned (a-2) or (a-3), (b) a graft modification product of the above-mentioned (a-1), (a-2), (a-3) or (a-4), (c) an elastomer graft modified with an unsaturated carboxylic acid or a derivative thereof and having a tensile modulus at 23° C. of 0.1–2000 kg/cm², and (d) polyamide together.

In the process for the preparation of the polyolefin resin composition of the invention, it is particularly desirable that the cycloolefin resin (a), the graft modification product (b) of the cycloolefin resin (a) and the graft modified elastomer (c) are first melt kneaded together to give a kneaded product, and the polyamide (d) is then added to the kneaded product in a molten state, followed by kneading.

DETAILED DESCRIPTION OF THE INVENTION

The polyolefin resin composition of the present invention contains (a) a cycloolefin resin, (b) a graft modification product of the cycloolefin resin, (c) elastomer graft modified with an unsaturated carboxylic acid and a derivative thereof and having a tensile modulus at 23° C. of 0.1–2000 kg/cm², and (d) polyamide, the amount, based on 100 parts by weight of the composition containing the components (a), (b), (c) and (d), of said component (a) being 0–59.5 parts by weight, preferably 0–40 parts by weight and especially 0–35 parts by weight, of said component (b) being 0.5–60 parts by weight, preferably 0.5–55 parts by weight and especially 5–55 parts by weight, of said component (c) being 2–30 parts by weight, preferably 5–30 parts by weight and especially 5–25 parts by weight, and of said component (d) being 20–60 parts by weight, preferably 25–60 parts by weight and especially 30–55 parts by weight.

In the polyolefin resin composition of the invention, a so-called "sea and island structure" is formed. In this case, it is considered that the resin composition comes to have morphologically a so-called "sea moiety" formed by the polyamide and a so-called "island moiety" formed by the components (a), (b) and (c).

Molded products that can be obtained by using this resin composition are high in impact strength, excellent in surface profile, particularly less in delamination and in surface glossiness. The molded articles thus obtained are low in water absorption properties and also excellent in oil resistance.

As the component (a), that is, the cycloolefin resin, used in the process for the preparation of the polyolefin resin composition of the invention, there may be mentioned (a-1) a copolymer of ethylene and cycloolefin represented by the following formula [I], (a-2) a ring opening homopolymer of cycloolefin represented by the following formula [I], (a-3) a ring opening copolymer of at least two kinds of cycloolefins represented by the following formula [I], and (a-4) a hydrogenation product of the above-mentioned (a-2) or (a-3).

These cycloolefin resins as illustrated above may be used either singly or in combination with other different polymer or copolymer.

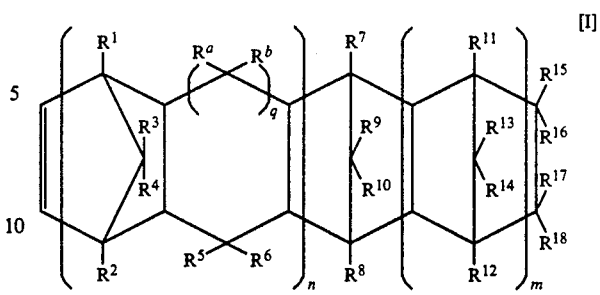

In the above-mentioned formula [I], n is 0 (zero) or 1, preferably 0 (zero), m is 0 (zero) or a positive integer, preferably 0–3, and q is 0 or 1.

$R^1$–$R^{18}$, $R^a$ and $R^b$ (formula [I]) individually represent an atom or group selected from the group consisting of hydrogen, halogen and hydrocarbon, wherein the halogen includes, for example, fluorine, chlorine, bromine and iodine atoms, and the hydrocarbon group includes usually alkyl of 1–6 carbon atoms and cycloalkyl of 3–6 carbon atoms. Concrete examples of the alkyl include methyl, ethyl, isopropyl, isobutyl and amyl, and those of the cycloalkyl include cyclohexyl, cyclopropyl, cyclobutyl and cyclopentyl.

In the above formula [I], when "q" is 0 (zero), the ring represented by using "q" forms five-member ring.

In the above mentioned formula [I], $R^{15}$–$R^{18}$ may form, linking together (in combination), a mono- or polycyclic ring which may have double bond. The mono- or polycyclic rings are described below. Further, these rings may have substituting groups such as a methyl group.

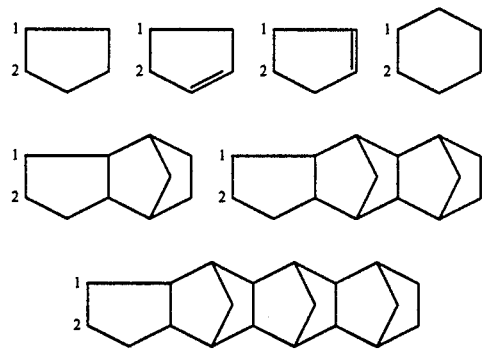

The carbon atoms indicated by 1 and 2 in the above-exemplified formulas represent carbon atoms of an alicyclic structure in the formula [I], wherein groups designated by $R^{15}$ to $R^{18}$ are bonded to the carbon atoms. And $R^{15}$ together with $R^{16}$, or $R^{17}$ together with $R^{18}$ may form an alkylidene of 2–4 carbon atoms, and concrete examples thereof include ethylidene, propylidene, isopropylidene and isobutylidene.

The cycloolefin type resins (a-1) to (a-4) have an intrinsic viscosity [η] of from 0.3 to 2.0 dl/g, preferably from 0.4 to 1.2 dl/g as measured at 135° C. in decalin, a softening temperature (TMA) of from 70° to 250° C., preferably from 100° to 200° C. as measured by a thermal mechanical analyzer, a glass transition temperature (Tg) of from 50° to 230° C., preferably from 80° to 180° C. and a crystallinity index of from 0 to 20%, preferably 0 to 2% as measured by X-ray diffractometry.

In the aforementioned cycloolefin type resins, cycloolefin ring-opening polymer (a-2) or cycloolefin ring-opening copolymer (a-3) is prepared by polymerization or copolymerization of cycloolefin or cycloolefins in the presence of a catalyst comprising halides, nitrate or acetylacetonate of ruthenium, rhodium, palladium, osmium, indium or platinum, and reducing agent, or presence of a catalyst comprising halides or acetylacetonate of titanium, palladium, zirconium or molybdenum, and organoaluminum compound.

The hydrogenated of the ring-opening (co)polymer is prepared by reducing the cycloolefin random polymer (a-2) or cycloolefin random copolymer (a-3) obtained above, using hydrogen in the presence of hydrogenating catalyst.

The cycloolefin random copolymer (a-1) is obtained by copolymerization of ethylene and unsaturated monomer represented by aforementioned formula [I] in the presence of a catalyst.

The cycloolefins represented by the above-mentioned formula [I] may easily be prepared by condensing cyclopentadienes with corresponding olefins or cycloolefins through Diels-Alder reaction.

The cycloolefins represented by the above-mentioned formula [I] used in the present invention include concretely:

bicyclo[2.2.1]hept-2-ene derivative,
tetracyclo[4.4.0.1$^{2,5}$.1$^{7,10}$]-3-dodecene derivative,
hexacyclo[6.6.1.1$^{3,6}$.1$^{10,13}$.0$^{2,7}$.0$^{9,14}$]-4-heptadecene derivative,
octacyclo[8.8.0.1$^{2,9}$.1$^{4,7}$.1$^{11,18}$.1$^{13,16}$.0$^{3,8}$.0$^{12,17}$]-5-docosene derivative,
pentacyclo[6.6.1.1$^{3,6}$.0$^{2,7}$.0$^{9,14}$]-4-hexadecene derivative,
heptacyclo-5-eicosene derivative,
heptacyclo-5-heneicosene derivative,
tricyclo[4.3.0.1$^{2,5}$]-3-decene derivative,
tricyclo[4.3.0.1$^{2,5}$]-3-undecene derivative,
pentacyclo[6.5.1.1$^{3,6}$.0$^{2,7}$.0$^{9,13}$]-4-pentadecene derivative,
pentacyclopentadecadiene derivative,
pentacyclo[4.7.0.1$^{2,5}$.0$^{8,13}$.1$^{9,12}$]-3-pentadecene derivative,
heptacyclo[7.8.0.1$^{3,6}$.0$^{2,7}$.1$^{10,17}$.0$^{11,16}$.1$^{12,15}$]-4-eicosene derivative, and
nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosene derivative,
pentacyclo[8.4.0.1$^{2,5}$.1$^{9,12}$.0$^{8,13}$]-3-hexadecene derivative,
heptacyclo[8.8.0.1$^{4,7}$.1$^{11,18}$.1$^{13,16}$.0$^{3,8}$.0$^{12,17}$]-5-heneicosene derivative,
nonacyclo[10.10.1.1$^{5,8}$.1$^{14,21}$.1$^{16,19}$.0$^{2,11}$.0$^{2,11}$.0$^{4,9}$.0$^{13,22}$.0$^{15,20}$]-5-hexacosene derivative, Concrete examples of the above-mentioned compounds are shown below.

Bicyclo[2.2.1]hept-2-ene derivative including such as those mentioned below.

Bicyclo[2.2.1]hept-2-ene

6-Methylbicyclo[2.2.1]hept-2-ene

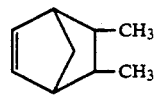

5,6-Dimethylbicyclo[2.2.1]-hept-2-ene

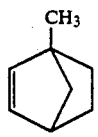

1-Methylbicyclo[2.2.1]hept-2-ene

6-Ethylbicyclo[2.2.1]hept-2-ene

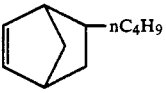

6-n-Butylbicyclo[2.2.1]hept-2-ene

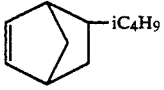

6-Isobutylbicyclo[2.2.1]hept-2-ene

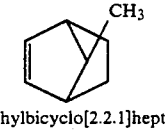

7-Methylbicyclo[2.2.1]hept-2-ene

Tetracyclo[4.4.0.1$^{2,5}$.1$^{7,10}$]-3-dodecene derivatives such as those mentioned below.

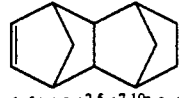

Tetracyclo[4.4.0.1$^{2,5}$.1$^{7,10}$]-3-dodecene

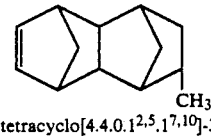

8-Methyltetracyclo[4.4.0.1$^{2,5}$.1$^{7,10}$]-3-dodecene

8-Ethyltetracyclo[4.4.0.1$^{2,5}$.1$^{7,10}$]-3-dodecene

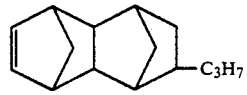

-continued
8-Propyltetracyclo[4.4.0.1²,⁵.1⁷,¹⁰]-3-dodecene

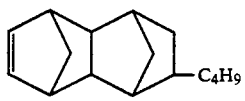

8-Butyltetracyclo[4.4.0.1²,⁵.1⁷,¹⁰]-3-dodecene

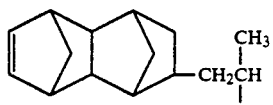

8-Isobutyltetracyclo[4.4.0.1²,⁵.1⁷,¹⁰]-3-dodecene

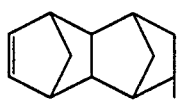

8-Hexyltetracyclo[4.4.0.1²,⁵.1⁷,¹⁰]-3-dodecene

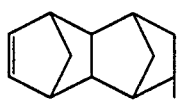

8-Cyclohexyltetracyclo[4.4.0.1²,⁵.1⁷,¹⁰]-3-dodecene

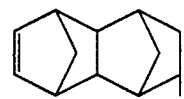

8-Stearyltetracyclo[4.4.0.1²,⁵.1⁷,¹⁰]-3-dodecene

5,10-Dimethyltetracyclo[4.4.0.1²,⁵.1⁷,¹⁰]-3-dodecene

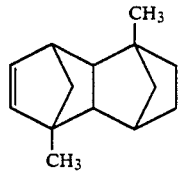

2,10-Dimethyltetracyclo[4.4.0.1²,⁵.1⁷,¹⁰]-3-dodecene

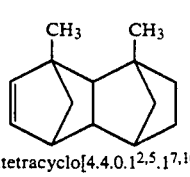

8,9-Dimethyltetracyclo[4.4.0.1²,⁵.1⁷,¹⁰]-3-dodecene

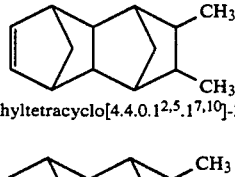

8-Ethyl-9-methyltetracyclo-
[4.4.0.1²,⁵.1⁷,¹⁰]-3-dodecene

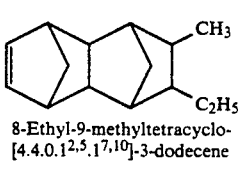

11,12-Dimethyltetracyclo-
[4.4.0.1²,⁵.1⁷,¹⁰]-3-dodecene

-continued

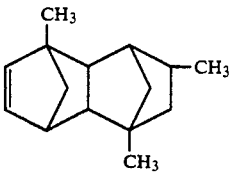

2,7,9-Trimethyltetracyclo-
[4.4.0.1²,⁵.1⁷,¹⁰]-3-dodecene

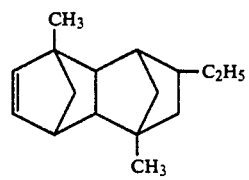

9-Ethyl-2,7-dimethyltetracyclo-
[4.4.0.1²,⁵.1⁷,¹⁰]-3-dodecene

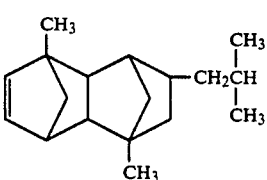

9-Isobutyl-2,7-dimethyltetracyclo-
[4.4.0.1²,⁵.1⁷,¹⁰]-3-dodecene

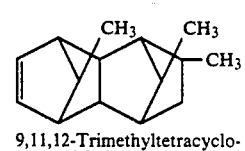

9,11,12-Trimethyltetracyclo-
[4.4.0.1²,⁵.1⁷,¹⁰]-3-dodecene

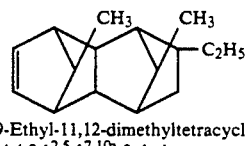

9-Ethyl-11,12-dimethyltetracyclo-
[4.4.0.1²,⁵.1⁷,¹⁰]-3-dodecene

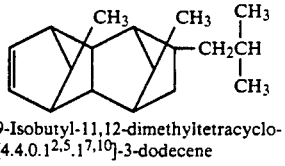

9-Isobutyl-11,12-dimethyltetracyclo-
[4.4.0.1²,⁵.1⁷,¹⁰]-3-dodecene

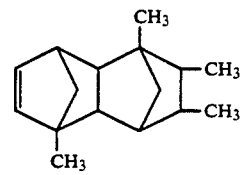

5,8,9,10-Tetramethyltetracyclo-
[4.4.0.1²,⁵.1⁷,¹⁰]-3-dodecene

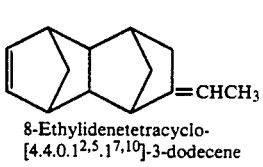

8-Ethylidenetetracyclo-
[4.4.0.1²,⁵.1⁷,¹⁰]-3-dodecene

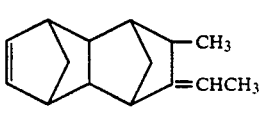

-continued

8-Ethylidene-9-methyltetracyclo-
[4.4.0.1$^{2,5}$.1$^{7,10}$]-3-dodecene

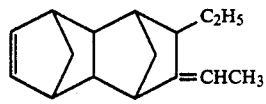

8-Ethylidene-9-ethyltetracyclo-
[4.4.0.1$^{2,5}$.1$^{7,10}$]-3-dodecene

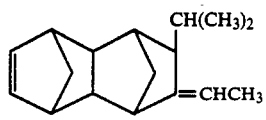

8-Ethylidene-9-isopropyltetracyclo-
[4.4.0.1$^{2,5}$.1$^{7,10}$]-3-dodecene

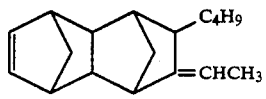

8-Ethylidene-9-butyltetracyclo-
[4.4.0.1$^{2,5}$.1$^{7,10}$]-3-dodecene

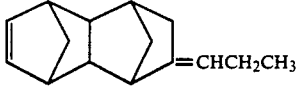

8-n-Propylidenetetracyclo-
[4.4.0.1$^{2,5}$.1$^{7,10}$]-3-dodecene

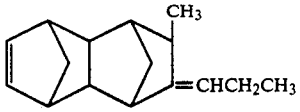

8-n-Propylidene-9-methyltetracyclo-
[4.4.0.1$^{2,5}$.1$^{7,10}$]-3-dodecene

8-n-Propylidene-9-ethyltetracyclo-
[4.4.0.1$^{2,5}$.1$^{7,10}$]-3-dodecene

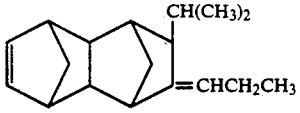

8-n-Propylidene-9-isopropyltetracyclo-
[4.4.0.1$^{2,5}$.1$^{7,10}$]-3-dodecene

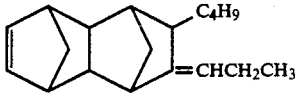

8-n-Propylidene-9-butyltetracyclo-
[4.4.0.1$^{2,5}$.1$^{7,10}$]-3-dodecene

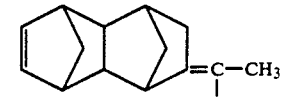

8-Isopropylidenetetracyclo-
[4.4.0.1$^{2,5}$.1$^{7,10}$]-3-dodecene

-continued

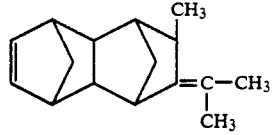

8-Isopropylidene-9-methyltetracyclo-
[4.4.0.1$^{2,5}$.1$^{7,10}$]-3-dodecene

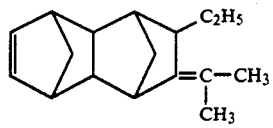

8-Isopropylidene-9-ethyltetracyclo-
[4.4.0.1$^{2,5}$.1$^{7,10}$]-3-dodecene

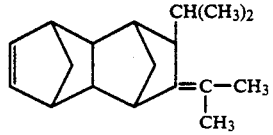

8-Isopropylidene-9-isopropyltetra-
cyclo[4.4.0.1$^{2,5}$.1$^{7,10}$]-3-dodecene

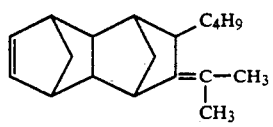

8-Isopropylidene-9-butyltetracyclo-
[4.4.0.1$^{2,5}$.1$^{7,10}$]-3-dodecene

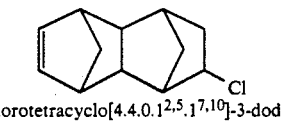

8-Chlorotetracyclo[4.4.0.1$^{2,5}$.1$^{7,10}$]-3-dodecene

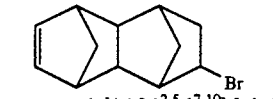

8-Bromotetracyclo[4.4.0.1$^{2,5}$.1$^{7,10}$]-3-dodecene

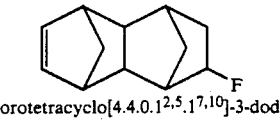

8-Fluorotetracyclo[4.4.0.1$^{2,5}$.1$^{7,10}$]-3-dodecene

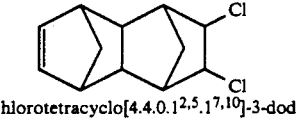

8,9-Dichlorotetracyclo[4.4.0.1$^{2,5}$.1$^{7,10}$]-3-dodecene

Hexacyclo[6.6.1.1$^{3,6}$.1$^{10,13}$.0$^{2,7}$.0$^{9,14}$]-4-heptadecene
derivatives such as those mentioned below.

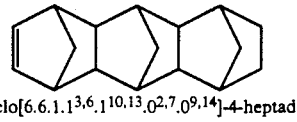

Hexacyclo[6.6.1.1$^{3,6}$.1$^{10,13}$.0$^{2,7}$.0$^{9,14}$]-4-heptadecene

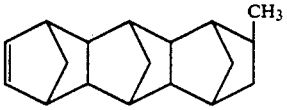

-continued

12-Methylhexacyclo[6.6.1.1³,⁶.
1¹⁰,¹³.0²,⁷.0⁹,¹⁴]-4-heptadecene

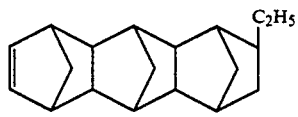

12-Ethylhexacyclo[6.6.1.1³,⁶.
1¹⁰,¹³.0²,⁷.0⁹,¹⁴]-4-heptadecene

12-Isobutylhexacyclo[6.6.1.1³,⁶.
1¹⁰,¹³.0²,⁷.0⁹,¹⁴]-4-heptadecene

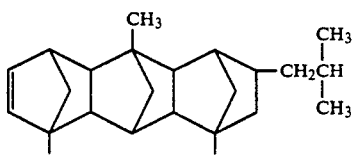

1.6.10-Trimethyl-12-
isobutylhexacyclo[6.6.1.1³,⁶.
1¹⁰,¹³.0²,⁷.0⁹,¹⁴]-4-heptadecene Octacyclo[8.8.0.1²,⁹.1⁴,⁷.1¹¹,¹⁸.1¹³,¹⁶.0³,⁸.0¹²,¹⁷]-5-docosene derivatives such as those mentioned below.

Octacyclo[8.8.0.1²,⁹.1⁴,⁷.
1¹¹,¹⁸.1¹³,¹⁶.0³,⁸.0¹²,¹⁷]-5-docosene

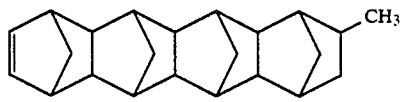

15-Methyloctacyclo-
[8.8.0.1²,⁹.1⁴,⁷.1¹¹,¹⁸.1¹³,¹⁶.
0³,⁸.0¹²,¹⁷]-5-docosene

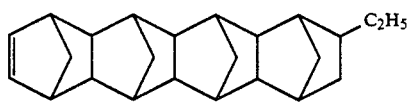

15-Ethyloctacyclo[8.8.0.
1²,⁹.1⁴,⁷.1¹¹,¹⁸.1¹³,¹⁶.0³,⁸.
0¹²,¹⁷]-5-docosene

Pentacyclo[6,6,1,1³,⁶.0²,⁷.0⁹,¹⁴]-4-hexadecene derivatives such as those mentioned below.

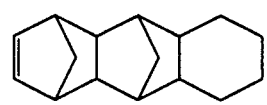

Pentacyclo[6,6,1,1³,⁶, 0²,⁷.0⁹,¹⁴]-4-hexadecene

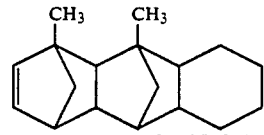

1,3-Dimethylpentacyclo[6,6,1,1³,⁶.0²,⁷.0⁹,¹⁴]-4-hexadecene

-continued

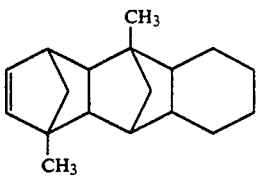

1,6-Dimethylpentacyclo[6,6,1,1³,⁶.0²,⁷.0⁹,¹⁴]-4-hexadecene

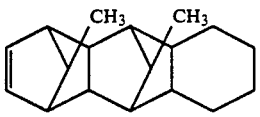

15,16-Dimethylpentacyclo[6,6,1,1³,⁶.0²,⁷.0⁹,¹⁴]-4-hexadecene;

Heptacyclo-5-eicosene derivatives or heptacyclo-5-heneicosene derivatives such as those mentioned below.

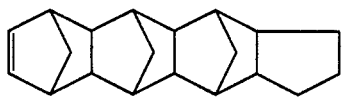

Heptacyclo[8.7.0.1²,⁹.1⁴,⁷.1¹¹,¹⁷.0³,⁸.0¹²,¹⁶]-5-eicosene

Heptacyclo[8.8.0.1²,⁹.1⁴,⁷.1¹¹,¹⁸.0³,⁸.0¹²,¹⁷]-5-heneicosene

Tricyclo[4,3,0,1²,⁵]-3-decene derivatives such as those mentioned below.

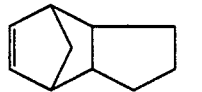

Tricyclo[4.3.0.1²,⁵]-3-decene

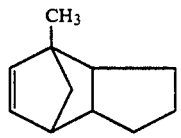

2-Methyltricyclo[4.3.0.1²,⁵]-3-decene

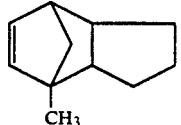

5-Methyltricyclo[4.3.0.1²,⁵]-3-decene

Tricyclo[4.4.0.1²,⁵]-3-undecene derivatives such as those mentioned below.

Tricyclo[4.4.0.1²,⁵]-3-undecene

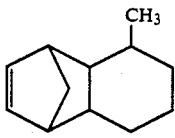

10-Methyl-tricyclo[4.4.0.1$^{2,5}$]-3-undecene

Pentacyclo[6.5.1.1$^{3,6}$.0$^{2,7}$.0$^{9,13}$]-4-pentadecene derivatives such as those mentioned below.

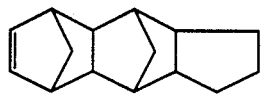

Pentacyclo[6.5.1.1$^{3,6}$.0$^{2,7}$.0$^{9,13}$]-4-pentadecene

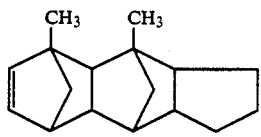

1,3-Dimethylpentacyclo[6.5.1.1$^{3,6}$.0$^{2,7}$.0$^{9,13}$]-4-pentadecene

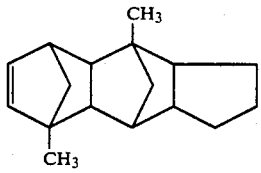

1,6-Dimethylpentacyclo[6.5.1.1$^{3,6}$.0$^{2,7}$.0$^{9,13}$]-4-pentadecene

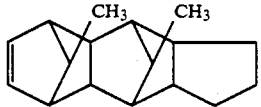

14,15-Dimethylpentacyclo[6.5.1.1$^{3,6}$.0$^{2,7}$.0$^{9,13}$]-4-pentadecene

Diene compounds such as mentioned below.

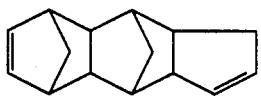

Pentacyclo[6.5.1.1$^{3,6}$.0$^{2,7}$.0$^{9,13}$]-4,10-pentadecadiene;

Pentacyclo[4.7.0.1$^{2,5}$.0$^{8,13}$.1$^{9,12}$]-3-pentadecene derivatives such as those mentioned below.

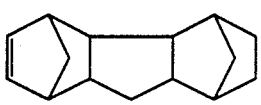

Pentacyclo[4.7.0.1$^{2,5}$.0$^{8,13}$.1$^{9,12}$]-3-pentadecene

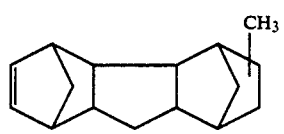

Methyl-substituted pentacyclo[4.7.0.1$^{2,5}$.0$^{8,13}$.1$^{9,12}$]-3-pentadecene Heptacyclo[7,8,0,1$^{3,6}$.0$^{2,7}$.1$^{10,17}$.0$^{11,16}$.1$^{12,15}$]-4-eicosene derivatives such as those mentioned below.

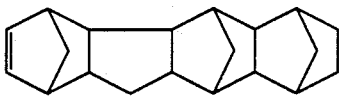

Heptacyclo[7.8.0.1$^{3,6}$.0$^{2,7}$.1$^{10,17}$.0$^{11,16}$.1$^{12,15}$]-4-eicosene

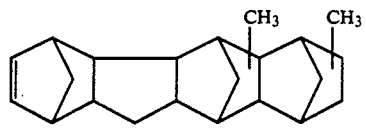

Dimethyl-substituted heptacyclo[7.8.0.1$^{3,6}$.0$^{2,7}$.1$^{10,17}$.0$^{11,16}$.1$^{12,15}$]-4-eicosene Nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosene derivatives such as those mentioned below.

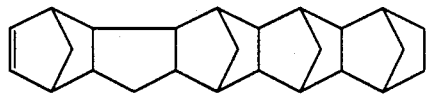

Nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosene

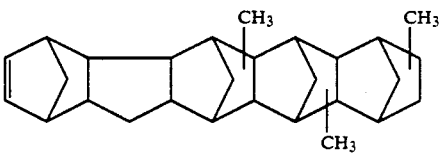

Trimethyl-substituted nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosene.

Pentacyclo[8.4.0.1$^{2,5}$.1$^{9,12}$.0$^{8,13}$]-3-hexadecene derivatives such as those mentioned below.

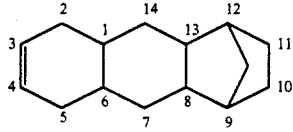

Pentacyclo[8.4.0.1$^{2,5}$.1$^{9,12}$.0$^{8,13}$]-3-hexadecene

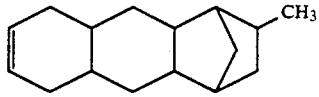

11-Methylpentacyclo[8.4.0.1$^{2,5}$.1$^{9,12}$.0$^{8,13}$]-3-hexadecene

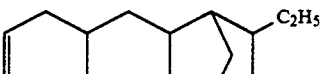

11-Ethylpentacyclo[8.4.0.1$^{2,5}$.1$^{9,12}$.0$^{8,13}$]-3-hexadecene

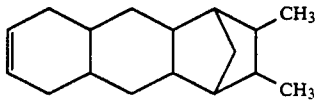

10,11-Dimethylpentacyclo[8.4.0.1$^{2,5}$.1$^{9,12}$.0$^{8,13}$]-3-hexadecene

Heptacyclo[8.8.0.1$^{4,7}$.1$^{11,18}$.1$^{13,16}$.0$^{3,8}$.0$^{12,17}$]-5-heneicosene derivatives such as those mentioned below.

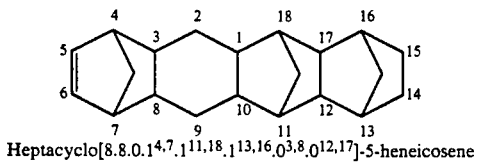
Heptacyclo[8.8.0.1$^{4,7}$.1$^{11,18}$.1$^{13,16}$.0$^{3,8}$.0$^{12,17}$]-5-heneicosene

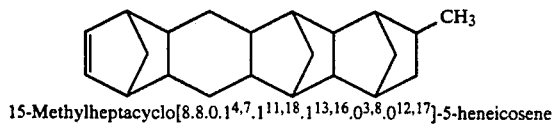
15-Methylheptacyclo[8.8.0.1$^{4,7}$.1$^{11,18}$.1$^{13,16}$.0$^{3,8}$.0$^{12,17}$]-5-heneicosene

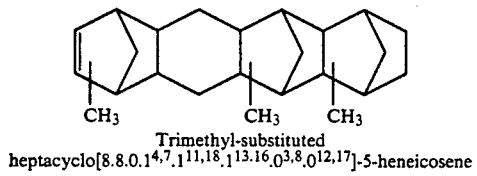
Trimethyl-substituted
heptacyclo[8.8.0.1$^{4,7}$.1$^{11,18}$.1$^{13,16}$.0$^{3,8}$.0$^{12,17}$]-5-heneicosene Nonacyclo [10.10.1.1$^{5,8}$.1$^{14,21}$.1$^{16,19}$.0$^{2,11}$.0$^{4,9}$.0$^{13,22}$.0$^{15,20}$]-6-hexacosene derivatives such as those mentioned below.

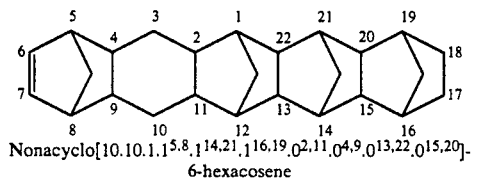
Nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene In the invention, monomers which are copolymerized with the cycloolefin represented by formula [I] to form the cycloolefin random copolymer is ethylene. Olefin compounds other than ethylene may also be copolymerized with the cycloolefin and ethylene to form the cycloolefin random copolymer used in the present invention. Examples of other olefin compounds copolymerizable with ethylene and the cycloolefin compound having the formula [I] include α-olefins having from 3 to 20 carbon atoms such as propylene, 1-butene, 4-methyl-1-pentene, 1-hexene, 1-octene, 1-decene, 1-dodecene, 1-tetradecene, 1-hexadecene, 1-octadecene and 1-eicosene;

cycloolefins such as cyclopentene, cyclohexene, 3-methylcyclohexene, cyclooctene and 3a,5,6,7a-tetrahydro-4,7-methano-1H-indene;

non-conjugated dienes such as 1,4-hexadiene, 4-methyl-1,4-hexadiene, 5-methyl-1,4-hexadiene, 1,7-octadiene, dicyclopentadiene, 5-ethylidene-2-norbornene and 5-vinyl-2-norbornene; and norbornene compounds such as norbornene-2, 5-methylnorbornene-2, 5-ethylnorbornene-2, 5-isopropylnorbornene-2, 5-n-butylnorbornene-2, 5-isobutylnorbornene-2, 5,6-dimethylnorbornene-2, 5-chloronorbornene-2, 2-fluoronorbornene-2 and 5,6-dichloronorbornene-2.

The above-mentioned other olefins can be employed singly or in combination.

The reaction of the above-mentioned olefins such as ethylene with the cycloolefin having the formula [I] is usually carried out in a hydrocarbon solvent.

Examples of the hydrocarbon solvents employed in the invention include aliphatic hydrocarbons such as hexane, heptane, octane and kerosene; alicyclic hydrocarbons such as cyclohexane and methylcyclohexane; and aromatic hydrocarbons such as benzene, toluene and xylene. Moreover, among the polymerizable unsaturated monomers used in the preparation of the olefin polymer having an alicyclic structure, there may also be used, as a reaction solvent, those monomers which are liquid at a reaction temperature.

The above-mentioned solvents can be employed singly or in combination.

As catalysts used in the copolymerization reaction of the olefins with the cycloolefins having the formula [I], there can be employed a catalyst comprising a vanadium compound and an organoaluminum compound which are both soluble in the above-described hydrocarbon solvent used as a reaction medium.

As the vanadium compounds which can be used as a catalyst in the invention, there can be mentioned compounds having the formula VO(OR)$_a$X$_b$ or V(OR)$_c$X$_d$ wherein R is a hydrocarbon group, X is halogen, and a, b, c and d are numbers satisfying $0 \leq a \leq 3$, $0 \leq b \leq 3$, $2 \leq a+b \leq 3$, $0 \leq c \leq 4$, $0 \leq d \leq 4$, and $3 \leq c+d \leq 4$.

Moreover, the vanadium compounds represented by the above formulas may also be adducts of an electron donor. Concrete examples of the vanadium compounds include VOCl$_3$, VO(OC$_2$H$_5$)Cl$_2$, VO(OC$_2$H$_5$)$_2$Cl, VO(O-iso-C$_3$H$_7$)Cl$_2$, VO(O-n-C$_4$H$_9$)Cl$_2$,

VO(OC$_2$H$_5$)$_3$,

VCl$_4$,

VOCl$_2$,

VOBr$_2$,

VO(O-n-C$_4$H$_9$)$_3$, and

VCl$_3$.2 (OC$_8$H$_{17}$OH)

The above-described vanadium compounds can be employed alone or in combination.

The electron donors forming the adducts together with the vanadium compounds are, for example, oxygen-containing electron donors such as alcohols, phenols, ketones, aldehydes, carboxylic acids, esters of organic and inorganic acids, ethers, acid amides, acid anhydrides and alkoxysilanes; and nitrogen-containing electron donors such as ammonia, amines, nitriles and isocyanates.

Concrete examples of suitable electron donors include alcohols having from 1 to 18 carbon atoms, such as methanol, ethanol, propanol, pentanol, hexanol, octanol, dodecanol, octadecyl alcohol, oleyl alcohol, benzyl alcohol, phenylethyl alcohol, isopropyl alcohol, cumyl alcohol and isopropylbenzyl alcohol;

phenolic compounds having from 6 to 20 carbon atoms, which may have a lower alkyl group, such as phenol, cresol, xylenol, ethylphenol, propylphenol, nonylphenol, cumylphenol and naphthol;

ketones having from 3 to 15 carbon atoms, such as acetone, methyl ethyl ketone, methyl isobutyl ketone, acetophenone, benzophenone and benzoquinone;

aldehydes having from 2 to 15 carbon atoms, such as acetaldehyde, propionaldehyde, octylaldehyde, benzaldehyde, tolualdehyde and naphthoaldehyde;

organic acid esters having from 2 to 30 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl (meth)acrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, n-butyl maleate, diisobutyl methylmalonate, di-n-hexyl cyclohexenecarboxylate, diethyl nadate, diisopropyl tetrahydrophthalate, diethyl phthalate, diisobutyl phthalate, di-n-butyl phthalate, di-2-ethylhexyl phthalate, γ-butyrolactone, δ-valerolactone, coumarin, phthalide and ethylene carbonate;

acid halides having from 2 to 15 carbon atoms, such as acetyl chloride, benzoyl chloride, toluyl chloride and anisic acid chloride;

ethers having from 2 to 20 carbon atoms, such as methyl ether, ethyl ether, isopropyl ether, butyl ether, amyl ether, tetrahydrofuran, anisole and diphenyl ether;

acid amides such as acetamide, benzamide and toluamide;

amines such as methylamine, ethylamine, diethylamine, tributylamine, piperidine, tribenzylamine, aniline, pyridine, picoline and tetramethylenediamine;

nitriles such as acetonitrile, benzonitrile and tolunitrile; and alkoxysilanes such as ethyl silicate and diphenyldimethoxysilane. The illustrated electron donors may be used alone or in combination.

The organoaluminum compounds used as the catalyst in the invention are compounds having at least one Al-C bond in the molecule.

One example of such organoaluminum compounds is represented by the formula (i):

$$R^1_m Al(OR^2)_n H_p X_q \quad (i)$$

wherein $R^1$ and $R^2$ each independently represent a hydrocarbon group having normally from 1 to 15, preferably from 1 to 4 carbon atoms; X is halogen; and m, n, p and q are numbers satisfying $0 \leq m \leq 3$, $0 \leq n < 3$, $0 \leq p < 3$, $0 \leq q < 3$, and $m+n+p+q=3$.

Another example of such compounds is a complex alkyl compound of aluminum and a metal of Group I, represented by the formula (ii):

$$M^1 Al R^1_4 \quad (ii)$$

wherein $M^1$ is Li, Na or K; and $R^1$ is as defined above.

Examples of the organoaluminum compounds having the formula (i) include:

compounds having the formula of $R^1_m Al(OR^2)_{3-m}$ wherein $R^1$ and $R^2$ are as defined above, and m is a number preferably satisfying $1.5 \leq m < 3$;

compounds having the formula of $R^1_m Al X_{3-m}$ wherein $R^1$ and X are as defined above, and m is a number preferably satisfying $0 < m < 3$;

compounds having the formula of $R^1_m Al H_{3-m}$ wherein $R^1$ is as defined above, and m is a number preferably satisfying $2 \leq m < 3$; and compounds having the formula of $R^1_m Al(OR^2)_n X_q$ wherein $R^1$, $R^2$ and X are as defined above, and m, n and q are numbers satisfying $0 < m \leq 3$, $0 \leq n < 3$, $0 \leq q < 3$ and $m+n+q=3$.

Concrete examples of the organoaluminum compounds having the formula (i) include trialkylaluminum compounds such as triethylaluminum, tributylaluminum and triisopropylaluminum;

dialkylaluminum alkoxides such as diethylaluminum ethoxide and dibutylaluminum butoxide;

alkylaluminum sesquialkoxides such as ethylaluminum sesquiethoxide and butylaluminum sesquibutoxide;

partially alkoxylated alkyl aluminum compounds such as those having an average composition represented by, for example, the formula of $R^1_{2.5} Al(OR^2)_{0.5}$;

dialkylaluminum halides such as diethylaluminum chloride, dibutylaluminum chloride and diethylaluminum bromide;

alkylaluminum sesquihalides such as ethylaluminum sesquichloride, butylaluminum sesquichloride and ethylaluminum sesquibromide;

partially halogenated alkylaluminum compounds such as ethylaluminum dichloride, propylaluminum dichloride and butylaluminum dibromide;

dialkylaluminum hydrides such as diethylaluminum hydride and dibutylaluminum hydride;

partially hydrogenated alkylaluminum compounds such as ethylaluminum dihydride and propylaluminum dihydride (alkylaluminum dihydride); and partially alkoxylated and halogenated alkylaluminum compounds such as ethylaluminum ethoxychloride, butylaluminum butoxychloride and ethylaluminum ethoxybromide.

Furthermore, the organoaluminum compounds may be such compounds being similar to those having the above-mentioned formula (i) as organoalumiunm compounds in which two aluminum atoms are bonded together via, for example, an oxygen atom or a nitrogen atom. Concrete examples of such compounds are as follows:

(C₂H₅)₂AlOAl(C₂H₅)₂, (C₄H₉)₂AlOAl(C₄H₉)₂, and $$(C_2H_5)_2AlNAl(C_2H_5)_2 \\ | \\ C_6H_5$$

Examples of the organoaluminum compounds having the formula (ii) include

LiAl(C₂H₅)₄, and

LiAl(C₇H₁₅)₄.

Among the above-exemplified compounds, particularly preferred are dialkylaluminum halides, alkylaluminum dihalides and mixtures thereof.

The vanadium compounds are used in such a manner that the concentration of the vanadium compounds in the reaction system is normally 0.01–5 gram atom/liter, preferably 0.05–3 gram atom/liter in terms of vanadium atoms. The organoaluminum compounds are used in such a manner that the ratio of aluminum atoms to vanadium atoms (Al/V) in the polymerization system is normally at least 2, preferably 2–50, and particularly preferably 3–20.

The cycloolefin random copolymer (a-1) obtained by using the above-mentioned catalysts generally contains repeating units derived from ethylene in an amount of 52 to 90 mol %, preferably 55 to 80 mol %, and repeating units derived from a cycloolefin in an amount of 10–48 mol %, preferably 20 to 45 mol %. When the cycloolefin random copolymer comprises repeating unit derived from α-olefin other than ethylene, the cycloolefin random copolymer may generally contain repeating unit derived from the α-olefin in an amount of less than 20 mol %, preferably less than 10 mol %. In the cycloolefin random copolymer, the repeating units derived from an olefin such as ethylene and the repeating units derived from a cycloolefin are substantially linearly arranged in the molecule.

In the cycloolefin copolymer (a-1) used in the invention, it is considered that the structural units derived from the cycloolefin of the formula [I] form the repeating units represented by the following formula [II].

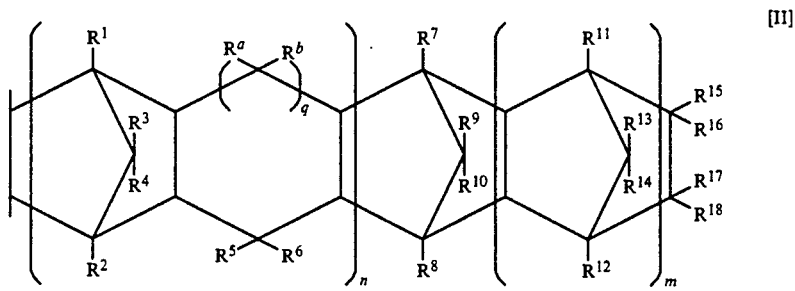

wherein m, n, q, $R^1$–$R^{18}$, $R^a$ and $R^b$ are as defined in the aforementioned formula [I].

As mentioned previously, it is also possible in the invention to use a ring opening cycloolefin polymer (a-2) or a ring opening copolymer (a-3) obtained by ring opening of the same or different cycloolefin monomer or a hydrogenation product thereof (a-4) in addition to the above-mentioned cycloolefin random copolymer (a-1). It is considered in this connection that the above-mentioned ring opening cycloolefin polymer (a-2), ring opening copolymer (a-3) and hydrogenation production (a-4) thereof are formed from the cycloolefin represented by the aforementioned formula [I] which undergoes reaction in the manner as schematized below.

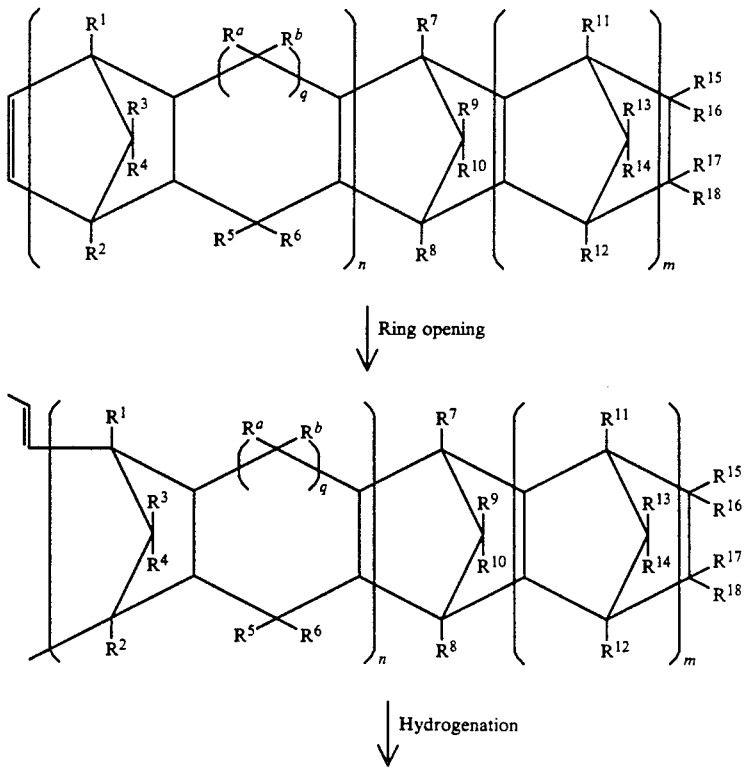

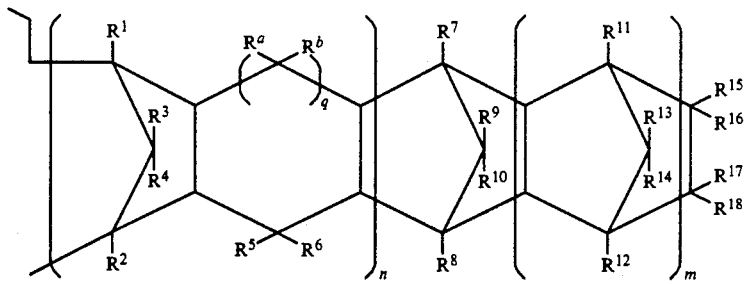

The graft modified cycloolefin resin (b) used in the invention may be prepared by graft modifying the above-mentioned cycloolefin resin (a-1), (a-2), (a-3) or (a-4) with an unsaturated carboxylic acid or a derivative thereof. Examples of the unsaturated carboxylic acid used herein include acrylic acid, maleic acid, fumaric acid, tetrahydrophthalic acid, itaconic acid, citraconic acid, crotonic acid, isocrotonic acid and nadic acid TM (endocisbicyclo [2,2,1] hept-5-ene-2,3-dicarboxylic acid). The derivatives of the above-mentioned unsaturated carboxylic acids are unsaturated carboxylic acid anhydrides, unsaturated carboxylic acid halides, unsaturated carboxylic acid amides, unsaturated carboxylic acid imides and ester compounds of unsaturated carboxylic acids. Concrete examples of these derivatives include maleyl chloride, maleimide, maleic anhydride, citraconic anhydride, monomethyl maleate, dimethyl maleate and glycidyl maleate.

These graft monomers exemplified above may be used either singly or in combination.

Of the above-exemplified graft monomers, preferred are unsaturated dicarboxylic acids or derivatives thereof, and particularly preferred are maleic acid and nadic acid TM or acid anhydrides thereof.

The graft modified cycloolefin resin (b) used in the invention may be prepared, for example, by graft polymerizing the above-mentioned graft monomer on a cycloolefin resin according to various processes known, per se. For instance, there is a process wherein the above-mentioned cycloolefin resin is melted, and the graft monomer is graft polymerized on the molten cycloolefin resin, or a process wherein the cycloolefin resin is dissolved in a solvent, and the graft monomer is graft polymerized on the cycloolefin resin dissolved in the solution. Further, the graft modified cycloolefin resin may be prepared by a process which comprises modifying an unmodified-cycloolefin resin by the addition thereto of the graft monomer so that the resulting modified cycloolefin resin has a desired graft ratio, or a process which comprises preparing in advance a graft modified cycloolefin resin having a high graft ratio, and diluting this cycloolefin resin with an unmodified-cycloolefin resin so that the diluted cycloolefin resin has a desired graft ratio. In the present invention, a graft modified cycloolefin resin prepared by any of the above-mentioned processes may be used. The modification ratio (graft ratio) of the graft modified cycloolefin resin used in the invention is usually 0.1–5% by weight, preferably 0.1–4.0% by weight.

In order to make graft copolymerization of the above-mentioned graft monomer proceed efficiently, the reaction therefor is desirably carried out in the presence of a radical initiator. The graft reaction is carried out at a temperature of usually 60°–350° C. The proportion of the radical initiator used is usually 0.001–5 parts by weight based on 100 parts by weight of the unmodified-cycloolefin resin.

Preferably useful radical initiators include organic peroxides, organic peresters and azo compounds.

Concrete examples of the useful radical initiators include benzoyl peroxide, dicumyl peroxide, di-tert-butyl peroxide, 2,5-dimethyl-2,5-di(tert-butylperoxy)-hexine-3, 2,5-dimethyl-2,5-di(tert-butylperoxy)hexane and 1,4-bis(tert-butylperoxyisopropyl)benzene.

The cycloolefin resin (a) and the graft modified cycloolefin resin (b) as illustrated above are used in such an amount that the total amount of the components (a) and (b) will amount to usually not more than 60 parts by weight, preferably 10–60 parts by weight based on 100 parts by weight of the sum total of the components (a), (b), (c) and (d).

Further, the cycloolefin resin (a) which is at least one kind selected from among (a-1) to (a-4) is used in such an amount that the selected cycloolefin resin will amount to usually 0–59.5 parts by weight, preferably 15–55 parts by weight based on 100 parts by weight of the sum total of the components (a), (b), (c) and (d). The graft modified cycloolefin resin (b) is used in such an amount that the component (b) will amount to usually 0.5–60 parts by weight, preferably 5–55 parts by weight based on 100 parts by weight of the sum total of the components (a), (b), (c) and (d). Further, the compounding ratio of (a-1) to (a-4) and (b) is preferably in such a range that the proportion of the sum total weight of (a-1) to (a-4) used to the weight of (b) used is from 0:60 to 59.5:0.5.

The graft modified elastomer (c) used in the invention is a modified copolymer having a tensile modulus, as measured according to ASTM D 638 at 23° C., of usually 0.1–2000 kg/cm$^2$, preferably 1–1500 kg/cm$^2$.

This graft modified elastomer (c) has a glass transition temperature (Tg) of usually from −150 to +50° C., preferably from −80° to −20° C., an intrinsic viscosity [η], as measured in decalin at 135° C., of 0.2–10 dl/g, preferably 1–5 dl/g, a density of usually 0.82–0.96 g/cm$^3$, preferably 0.84–0.92 g/cm$^3$, and a crystallinity index, as measured by x-ray diffractometry, of usually not more than 30%, preferably not more than 25%.

When kneaded together with the above-mentioned cycloolefin resin (a) and the graft modified cycloolefin resin (b), the graft modified elastomer (c) will come to have such a property that at least a part of said elastomer is finely dispersed in the resulting cycloolefin random copolymer.

When the graft modified elastomer (c) used in the invention is a graft modified α-olefin copolymer, such α-olefin copolymer includes concretely (c-1) graft modified ethylene/α-olefin copolymer rubber and (c-2) graft modified propylene/α-olefin copolymer rubber.

These copolymer rubber (c-1) and (c-2) may be used either singly or in combination.

The constituent α-olefins used in the preparation of the above-mentioned graft modified ethylene/α-olefin copolymer rubber (c-1) may include usually those having 3-20 carbon atoms, for example, propylene, 1-butene, 1-pentene, 1-hexene, 4-methyl-1-pentene, 1-octene, 1-decene and mixtures thereof. Of these α-olefins exemplified above, particularly preferred are propylene and/or 1-butene.

The constituent α-olefins used in the preparation of the above-mentioned graft modified propylene/α-olefin copolymer rubber (c-2) may include usually those having 4-20 carbon atoms, for example, 1-butene, 1-pentene, 1-hexene, 4-methyl-1-pentene, 1-octene, 1-decene and mixtures thereof. Of these α-olefins exemplified above, particularly preferred is 1-butene.

So long as no characteristics of α-olefin copolymer are marred, the α-olefin copolymers used in the invention may contain such component units other than the component units derived from α-olefins such as derived from diene compounds.

For example, the above-mentioned other component units permitted to be contained in the α-olefin copolymers used in the invention include component units derived from chain non-conjugated dienes such as 1,4-hexadiene, 1,6-octadiene, 2-methyl-1,5-hexadiene, 6-methyl-1,5-heptadiene and 7-methyl-1,6-octadiene; cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and diene compounds such as 2,3-diisopropylidene-5-norbornene, 2-ethylidene-3-isopropylidene-5-norbornene and 2-propenyl-2,2-norbornadiene. The content in the α-olefin copolymer of repeating units derived from the above-mentioned diene components is usually not more than 10 mol %, preferably not more than 5 mol %.

In the graft modified ethylene/α-olefin copolymer (c-1) used in the invention, the molar ratio (ethylene/α-olefin) of ethylene to α-olefin, though it varies depending upon the kind of α-olefin used, is generally from 10/90 to 90/10, preferably from 50/50 to 90/10. The above-mentioned molar ratio is preferably from 50/50 to 90/10 when α-olefin is propylene, and is preferably from 50/50 to 90/10 when α-olefin is that which has not less than 4 carbon atoms.

In the graft modified propylene/α-olefin copolymer (c-2) used in the invention, the molar ratio (propylene/α-olefin) of propylene to α-olefin, though it varies depending upon the kind of α-olefin used, is generally from 50/50 to 90/10. The above-mentioned molar ratio is preferably from 50/50 to 90/10 when α-olefin is 1-butene, and is preferably from 50/50 to 90/10 when α-olefin is that which has not less than 5 carbon atoms.

Of the graft modified α-olefin copolymers used in the invention, preferred are graft modified copolymers having the ethylene content of 35-50 mol % and a crystallinity index of not more than 10% obtained by graft modifying ethylene/propylene random copolymer or ethylene/α-olefin random copolymers with graft monomers, because they are excellent in mechanical properties such as impact strength, etc. which have been improved by the effect of the invention.

Graft monomers used for preparing the graft modified elastomer (c) in the invention are preferably unsaturated carboxylic acids or derivatives thereof. Examples of the unsaturated carboxylic acids include acrylic acid, maleic acid, fumaric acid, tetrahydrophthalic acid, itaconic acid, citraconic acid, crotonic acid isocrotonic acid and nadic TM acid (endocis-bicyclo[2,2,1]hept-5-ene-2,3-dicarboxylic acid). The derivatives of the above-mentioned unsaturated carboxylic acids are unsaturated carboxylic acid anhydrides, unsaturated carboxylic acid halides, unsaturated carboxylic acid amides, unsaturated carboxylic acid imides and ester compounds of unsaturated carboxylic acids. Examples of these derivatives are concretely malenyl chloride, maleimide, maleic anhydride, monomethyl maleate, dimethyl maleate and glycidyl maleate.

These graft monomers exemplified above may be used either singly or in combination.

Of the above-exemplified graft monomers, preferred are unsaturated dicarboxylic acids or derivatives thereof, particularly maleic acid, nadic acid TM or acid anhydrides thereof.

The graft modified α-olefin copolymers used in the invention may be prepared, for example, by modifying α-olefin copolymers with the above-mentioned graft monomers according to various processes known, per se. For example, there is a process wherein the above-mentioned α-olefin copolymer is melted, and the graft monomer is graft polymerized on the molten α-olefin copolymer, or a process wherein the α-olefin copolymer is dissolved in a solvent, and the graft monomer is graft copolymerized on the α-olefin copolymer dissolved in the solution. Further, the graft modified α-olefin copolymer may be prepared by a process which comprises modifying an unmodified α-olefin copolymer by the addition thereto of the graft monomer so that the resulting modified α-olefin copolymer has a desired graft ratio, or a process which comprises preparing in advance a graft modified α-olefin copolymer having a high graft ratio, and diluting this graft modified α-olefin copolymer with an unmodified α-olefin copolymer so that the diluted graft modified α-olefin copolymer has a desired graft ratio. In the invention a graft modified α-olefin copolymer prepared by any of the above-mentioned processes may be used. The modification ratio (graft ratio) of the graft modified α-olefin copolymer used in the invention is usually 0.01-5% by weight, preferably 0.1-4% by weight.

In order to make graft copolymerization of the above-mentioned graft monomer proceed efficiently, it is desirable to carry out the reaction therefor in the presence of a radical initiator. The graft reaction is carried out at a temperature of usually 60°-350° C. The proportion of the radical initiator used is usually 0.001-5 parts by weight based on 100 parts by weight of the unmodified α-olefin copolymer.

Preferably useful radical initiators include organic peroxides and organic peresters. Concrete examples of such radical initiators include benzoyl peroxide, dichlorobenzoyl peroxide, dicumyl peroxide, di-tert-butyl peroxide, 2,5-dimethyl-2,5-di(peroxybenzoate)hexine-3, 1,4-bis(tert-butylperoxyisopropyl)benzene, lauroyl peroxide, tert-butyl peracetate, 2,5-dimethyl-2,5-di(tert-butylperoxy)hexine-3, 2,5-dimethyl-2,5-di(tert-butylperoxy)hexane, tert-butyl perbenzoate, tert-butyl perphenylacetate, tert-butyl perisobutylate, tert-butyl per-sec-octylate, tert-butyl perpivalate, cumyl perpivalate and tert-butyl perdiethylacetate. Further, azo compounds may also be used as the radical initiator in the invention. Concrete examples of the azo compounds include azobisisobutyronitrile and dimethyl azoisobutylate.

Of the peroxides exemplified above as the radical initiators, preferred are dialkyl peroxides such as benzoyl peroxide, dicumyl peroxide, di-tert-butyl peroxide, 2,5-dimethyl-2,5-di(tert-butylperoxy)hexine-3, 2,5-dimethyl-2,5-di(tert-butylperoxy)hexane and 1,4-bis(-tert-butylperoxyisopropyl)benzene.

As the graft modified α-olefin copolymer in the invention, there are used usually the above-mentioned graft modified ethylene/α-olefin copolymer (c-1) and graft modified propylene/α-olefin copolymer (c-2), either singly or in combination. However, these copolymers (c-1) and (c-2) may contain polymers, copolymers or graft modified copolymer other than the above-mentioned graft modified elastomeric copolymers so long as no characteristics of the graft modified elastomeric α-olefin copolymers are marred.

Other polymers or copolymers as referred to above may be aromatic vinyl hydrocarbon/conjugated diene copolymers or hydrogenation products thereof. Concretely, such aromatic vinyl hydrocarbon/conjugated diene copolymers or hydrogenation products as mentioned above include styrene/butadiene copolymer rubber, styrene/butadiene/styrene copolymer rubber, styrene/isoprene block copolymer rubber, styrene/isoprene/styrene block copolymer rubber, hydrogenated styrene/butadiene/styrene block copolymer rubber and hydrogenated styrene/isoprene/styrene block copolymer rubber.

The graft modified elastomer (c) as illustrated above is used in the polyolefin resin composition of the invention containing the components (a), (b), (c) and (d) in such an amount that the component (c) will amount to 2–30 parts by weight based on 100 parts by weight of the sum total of the components (a), (b), (c) and (d). In particular, the amount of the component (c) used is preferably 5–20 parts by weight.

The polyolefin resin composition containing the component (c) in the amount as defined above can exhibit improved mechanical characteristics such as impact strength, etc. without sacrificing excellent characteristics of the cycloolefin random copolymer (a) contained in said composition.

The polyamide (d) used in the invention are various polyamides obtained, for example, by polycondensation reaction of diamine component with dicarboxylic acid component or by ring opening polymerization of a compound capable of forming amino and carboxyl groups or a functional derivative thereof.

Concrete examples of the polyamide used in the invention include nylon-6, nylon-66, nylon-610, nylon-11, nylon-612, nylon-12, copolymerized nylon formed from caprolactam and aqueous salt solution of nylon, nylon MXD6 formed from methaxylenediamine and adipic acid, nylon-46, methoxymethylated polyamide, polyhexamethylenediamine terephthalamide and polyhexamethylenediamine isophthalamide.

The polyamides exemplified above may be used in the invention either singly or in combination.

The polyamides referred to in the invention are condensates of diamine component and dicarboxylic acid component or a ring opening polymers of lactams as mentioned above, and preferred are those having an intrinsic viscosity [$\eta$], as measured in 96% sulfuric acid at 25° C., of from 0.2 to 2.5 dl/g. In particular, it is preferable to use in the invention a polyamide having an intrinsic viscosity [$\eta$], as measured in 96% sulfuric acid at 25° C., of from 0.5 to 1.8 dl/g.

The polyamide (d) as illustrated above is used in the polyolefin resin composition containing the components (a), (b), (c) and (d) of the invention in such an amount that the component (d) will amount to 20–60 parts by weight based on 100 parts by weight of the total sum of the components (a), (b), (c) and (d). In the polyolefin resin composition, the so-called "sea and island structure" can be formed by the component (d) contained therein in an amount of 20–60 parts by weight. In this case, it is considered that the resin composition comes to have morphologically the so-called "sea moiety" formed by the polyamide and the so-called "island moiety" formed by the components (a), (b) and (c).

In the process for the preparation of the resin composition of the invention, the above-mentioned components (a), (b), (c) and (d) are mixed in a molten state and kneaded together. The components (a), (b), (c) and (d) may be mixed and kneaded together, for example, by a method wherein these components are mechanically mixed together in the proportion as defined above, and the resulting mixture in a molten state is kneaded by means of a melt kneading equipment, for example, a double-screw kneader (hereinafter this method is sometimes called "batch feed method", or by a method wherein the components (a), (b) and (c) are mechanically mixed together in the proportion as defined above, the resulting mixture is heated to a molten state by means of a melt kneading equipment, for example, a double-screw kneader, and the component (d) is then added to the molten mixture, followed by kneading (hereinafter this method is sometimes called "side feed method"). The polyolefin resin composition of the invention may be prepared under suitably predetermined conditions by employing either the above-mentioned batch feed method or side feed method. In the polyolefin resin composition prepared by the side feed method as mentioned above, however, the resin particles of the "island moiety" dispersed in said composition tend to become smaller in particle diameter and the particle size distribution of said "island moiety" tends to become narrower, as compared with the polyolefin resin composition prepared by the batch feed method. This side feed method is illustrated below in detail.

In the preparation of the polyolefin resin composition according to the side feed method, the components (a), (b) and (c) are melt kneaded together in a single or double-screw extruder or a mixer, and the polyamide (d) is supplied to the molten resin stream, followed by kneading.

This polyamide (d) may be added in a solid state to the molten resin stream of the components (a), (b) and (c), or may be supplied in a molten state to join the molten resin stream of the components (a), (b) and (c), followed by kneading. In the present invention, it is particularly preferable that the polyamide in a solid state is added to the molten resin stream of the components (a), (b) and (c), followed by kneading.

It is possible to prepare the polyolefin resin composition capable of forming molded articles excellent particularly in low temperature characteristics, oil resistance and surface glossiness by the side feed method wherein the solid polyamide (d) is supplied to the molten resin stream of the components (a), (b) and (c), followed by kneading.

Also, by virtue of the side feed method mentioned above, pellets having the sea and island structure comprising very small island moieties can be prepared, and an average diameter of the island moieties is usually not more than 2 μm and, in most cases, not more than 1 μm.

The conditions under which the molten resin stream of the components (a), (b) and (c) may be predetermined in accordance with those employed for kneading resins such as polyolefin, etc. The conditions for kneading the molten resin stream of the components (a), (b) and (c) to which the polyamide has been added may also be predetermined in accordance with commonly used kneading conditions except that the heating temperature employed is regulated so that a rapid temperature drop due to the addition of the polyamide will not take place.

In addition to the above-mentioned components, the polyolefin resin composition of the invention may contain various additives such as inorganic fillers, organic fillers, heat stabilizers, weathering agents, antistatic agents, antislip agents, anti-blocking agents, anti-fogging agents, lubricants, pigments, dyes, natural oil, synthetic oil and wax. These additives may be added to the resin composition at any stage during the course of preparation of said composition.

In addition to the purposes for which common polyolefins are used, the polyolefin resin compositions prepared by the process of the invention are suitably applicable, in particular, to the field of materials, for which mechanical strength is required, such as fiber-reinforced PP, ABS resin, modified polyphenylene oxide, etc.

EFFECT OF THE INVENTION

Molded articles formed by using the polyolefin resin compositions of the present invention are high in impact strength, excellent in surface properties particularly less in surface peeling, and surface glossiness. These molded articles are also low in water absorption properties and high in oil resistance.

According to the process for the preparation of the polyolefin resin compositions of the invention, because the cycloolefin resin (a), graft modified cycloolefin resin (b), graft modified elastomer (c) and polyamide (d) are melt kneaded together, the polyolefin resin compositions obtained thereby come to have such characteristics as mentioned above.

In the above-mentioned process of the invention, moreover, by side feeding the polyamide (d) to the molten resin stream of the components (a), (b) and (c), the resulting polyolefin resin compositions come to be able to form the sea and island structure in which the components (a), (b) and (c) have been finely dispersed in the polyamide (d).

Further, the resin compositions obtained by the process of the invention have such an advantage over polyamide that the articles being molded out of said compositions may be lowered not only in molding shrinkage but also in water absorption.

The present invention is illustrated below with reference to examples, but it should be construed that the invention is in no way limited to those examples.

Method of evaluation

Characteristics of the cycloolefin random copolymer and graft modified elastomer (also called graft modified elastomeric copolymer) used in the invention, and of the polyolefin resin composition of the invention were determined in the following manner.

Intrinsic viscosity

The measurement was conducted in decalin at 135° C.

Softening temperature (TMA)

Taken as TMA was the temperature at which a flat-ended needle of 1 mm in diameter penetrated under a load of 50 g to a depth of 100 μm into a test specimen heated at a rate of 5° C./min.

Content of graft monomer in graft modified elastomeric copolymer

The measurement was conducted by means of $^{13}$C-NMR.

Crystallinity index

The measurement was conducted by means of X-ray diffractometry at 23° C.

Tensile modulus

A press molded test specimen of 2 mm in thickness was tested for in accordance with ASTM D 638.

IZ impact strength

An injection molded notched specimen of ⅛ inch in thickness was tested for at 23° C. in accordance with ASTM D 256.

Initial flexural modulus (FM)

An injection-molded specimen of ⅛ inch in thickness was tested for at 23° C. and a crosshead speed of 20 mm/min in accordance with ASTM D 790.

Flexural yield stress (FS)

The same test as in FM was conducted.

Glossiness (Gloss)

An injection-molded square plate of 2 mm in thickness was tested at 23° C. and an angle of incidence of 60° in accordance with ASTM D 523.

Melt index (MI)

The measurement was conducted at 260° C. under a load of 2.16 kg in accordance with JIS-K-6760.

Cyclohexane and water absorption

A test specimen, 100 mm × 100 mm × 2 mm, was immersed for 72 hours in cyclohexane or water, the cyclohexane or water remaining on the surface of the specimen was removed, the thus immersed specimen was then weighed to obtain an increase in weight, and the increment was represented by percentage on the weight of the specimen prior to immersion.

Sample Preparation Example 1

Cycloolefin copolymer (a-1)

Copolymerization reaction of ethylene with tetracyclo[4.4.0.1$^{2,5}$.1$^{7,10}$]dodecene-3 (hereinafter sometimes abbreviated to "TCD-3") was carried out continuously using a 1-liter reactor equipped with a stirring blade. That is, there were continuously fed to the reactor through the upper portion thereof a cyclohexane solution of TCD-3 at a rate of 0.4 1/hr so that the concentration in the reactor of TCD-3 becomes 60 g/l, a cyclohexane solution of VO(OC$_2$H$_5$)Cl$_2$ as a catalyst at a rate of 0.5 1/hr so that the vanadium concentration in the reactor becomes 0.5 mmol/l (in this case, the concentration of vanadium to be fed is 2.86 times the vanadium concentration in the reactor), a cyclohexane solution of ethylaluminum sesquichloride Al(C$_2$H$_5$)$_{1.5}$Cl$_{1.5}$ at a rate of 0.4 l/hr so that the aluminum concentration in the reactor becomes 4.0 mmol/l, and cyclohexane at a rate of 0.7 l/hr. On the one hand, the polymer solution was withdrawn continuously from the reactor through the lower portion thereof so that the polymer solution in the reactor always amounts to 1 liter (that is, the retention time becomes 0.5 hour).

To the polymerization system were fed ethylene at a rate of 20 l/hr, nitrogen at a rate of 10 l/hr and hydrogen at a rate of 0.5 l/hr using a bubbling tube.

The copolymerization reaction was carried out at a temperature kept at 10° C. by means of circulation of a cooling medium in a jacket surrounding the reactor.

The copolymerization reaction carried out under the polymerization conditions mentioned above resulted in the preparation of an ethylene/TCD-3 random copolymer.

That is, the polymerization reaction was stopped by adding a cyclohexane/isopropyl alcohol mixture (1/1 volume ratio) to the polymer solution withdrawn from the reactor through the lower portion thereof. Thereafter, 1 liter of an aqueous solution containing 5 ml of concentrated hydrochloric acid and the polymer solution withdrawn are brought into contact with each other in the proportion of 1:1, while strongly stirring them by means of a homomixer, whereby the residual catalyst was allowed to migrate to an aqueous phase.

The mixture thus resulted was allowed to stand, the aqueous phase was removed therefrom, the polymer solution was purified by washing twice with distilled water and then isolated.

The polymer solution thus isolated was brought into contact with acetone amounting to three times as much as the polymer solution while stirring them strongly, and the solids thereby precipitated were collected by filtration, followed by thorough washing with acetone. The solids thus collected were then dried for 24 hours in a stream of nitrogen at 130° C. and 350 mmHg.

By carrying out continuously a series of operations mentioned above, an ethylene/TCD-3 random copolymer was prepared at a rate of 76 g/hr (36 g/l).

From the results obtained in $^{13}$C-NMR analysis of this copolymer, it was found that the ethylene content in the copolymer is 63 mol %. Furthermore this copolymer had an intrinsic viscosity [$\eta$], as measured in decalin at 135° C., of 0.5 dl/g, an iodine value of 1.0 and TMA of 150° C.

Hereinafter, this cycloolefin random copolymer (a-1) is referred to as "PO-1".

Sample Preparation Example 2

Cycloolefin copolymer (a-1)

Sample Preparation Example 1 was repeated except that ethylene was fed at a rate of 10 l/hr and hydrogen was fed at a rate of 0.3 l/hr, whereby an ethylene/TCD-3 copolymer was prepared.

From the results obtained in $^{13}$C-NMR analysis of this copolymer, it was found that the ethylene content in the copolymer is 56 mol %. Furthermore, this copolymer had an intrinsic viscosity [$\eta$], as measured in decalin at 135° C., of 0.7 dl/g, an iodine value of 1.0 and TMA of 180° C.

Hereinafter, this cycloolefin random copolymer (a-1) is referred to as "PO-2".

Sample Preparation Example 3

Graft modified cycloolefin copolymer (b)

A mixture of 100 parts by weight of "PO-1" obtained in Sample Preparation Example 1, 1 part by weight of maleic anhydride and 0.2 part by weight of 2,5-dimethyl-2,5-di(t-butylperoxy) hexine-3 (trade name Perhexine 25B, a product of Nippon Oils And Fats Co., Ltd.) was melt kneaded at 260° C. using a double-screw extruder equipped with a vent of 30 mm in diameter to obtain a graft modified cycloolefin copolymer (b).

The content of grafted maleic anhydride unit in the graft modified cycloolefin copolymer obtained was 0.83% by weight.

Hereinafter, this graft modified cycloolefin copolymer (b) is referred to as "GPO-1".

Sample Preparation Example 4

Graft modified cycloolefin copolymer (b)

A mixture of 100 parts by weight of "PO-2" obtained in Sample Preparation Example 2, 1 part by weight of maleic anhydride and 0.2 part by weight of 2,5-dimethyl-2,5-di(t-butylperoxy) hexine-3 (trade name Peroxine 25B, a product of Nippon Oils And Fats Co., Ltd.) was melt kneaded at 260° C. using a double-screw extruder equipped with a vent of 30 mm in diameter to obtain a graft modified cycloolefin copolymer (b).

The content of the grafted maleic anhydride unit in the graft modified cycloolefin copolymer obtained was 0.81% by weight.

Hereinafter, this graft modified cycloolefin copolymer (b) is referred to as "GPO-2".

Sample Preparation Example 5

Graft modified cycloolefin copolymer (b)

A mixture of 100 parts by weight of "PO-2" obtained in Sample Preparation Example 2, 1 part by weight of maleic anhydride and 0.05 part by weight of 2,5-dimethyl-2,5-di(t-butylperoxy) hexine-3 (trade name Perhexine 25B, a product of Nippon Oils And Fats Co., Ltd.) was melt kneaded at 260° C. using a double-screw extruder equipped with a vent of 30 mm in diameter to obtain a graft modified cycloolefin copolymer (b).

The content of the grafted maleic anhydride unit in the graft modified cycloolefin copolymer obtained was 0.26% by weight.

Hereinafter, this graft modified copolymer (b) is referred to as "GPO-3".

Sample Preparation Example 6

Graft modified elastomer (c)

A mixture of 100 parts by weight of an ethylene/propylene copolymer having the ethylene content of 80 mol % and an intrinsic viscosity [$\eta$], as measured in decalin at 135° C., of 2.2 dl/g (this copolymer is referred to as "MP-0"), 1 part by weight of maleic anhydride and 0.2 part by weight of 2,5-dimethyl-2,5-di(t-butylperoxy)hexine-3 was melt kneaded at 260° C. using a double-screw extruder equipped with a vent of 30 mm in diameter to obtain a graft modified elastomer (c).

The content of the grafted maleic anhydride unit in the graft modified elastomer obtained was 0.90% by weight. The graft modified elastomer (c) has a tensile modulus of 80 kg/cm$^2$.

Hereinafter, this graft modified elastomer is referred to as "MP-1".

Sample Preparation Example 7

Graft modified elastomer (c)

Sample Preparation Example 6 was repeated except that in place of 1 part by weight of the maleic anhydride, 1 part by weight of glycidyl methacrylate was used, whereby a graft modified elastomer (c) was prepared.

The content of the grafted glycidyl methacrylate unit in the graft modified elastomer obtained was 0.90% by weight. The graft modified elastomer (c) has a tensile modulus of 80 kg/cm$^2$.

Hereinafter, this graft modified elastomer (c) is referred to as "MP-2".

EXAMPLE 1

A polyolefin resin composition was prepared by using a double-screw extruder having a die of 30 mm in diameter, said extruder being designed as to be capable of feeding a resin or resin composition during melt kneading operation to the resin or resin composition being melt kneaded in the extruder.

Hereinafter, the fact that a resin or resin composition (A) is fed in the above-mentioned extruder to the resin or resin composition (B) being melt kneaded in said extruder is expressed by saying "A is side fed to B". In contrast thereto, the fact that A and B are melt kneaded in a batch is expressed by saying "A and B are fed in a batch".

Using the above-mentioned extruder (preset temperature: 230° C.), 30 parts by weight of the cycloolefin random copolymer (PO-1) obtained in Sample Preparation Example 1, 10 parts by weight of the elastomer (GPO-1) obtained in Sample Preparation Example 3 and 10 parts by weight of the graft modified elastomer (MP-1) obtained in Sample Preparation Example 6 were kneaded together to prepare a resin composition. To 100 parts by weight of this resin composition, 100 parts by weight (the same amount as that of the above-mentioned resin composition) of a polyamide resin (nylon 6, a product of Toray Ind. Inc. under a trade name of Amiran CM 1007) was side fed to prepare a polyolefin resin composition.

The polyolefin resin composition dried for 8 hours at 120° C. was molded into a test specimen and a square plate for examination of physical properties using an injection molding machine (30 EPN of Toshiba IS) at a molding temperature of 270° C. and a mold temperature of 70° C.

Physical properties of the test specimens as measured are shown in Table 1.

As is clear from the results shown in Table 1, the composition prepared was excellent in impact strength, rigidity, heat resistance, glossiness and oil resistance.

Subsequently, the test specimen was dyed with ruthenic acid or osmic acid to prepare a specimen for transmission electron microscopic observation. On observation of the specimen under a transmission electron microscope, it was found that spherical or elliptical dispersed particles having an average particle diameter of not more than 1 μm are present in the specimen.

EXAMPLE 2

Example 1 was repeated except that nylon 6,6 (trade name: Amiran CM 3001-N, a product of Toray Ind. Inc.) was used as the polyamide resin and the extrusion temperature employed was changed to 260° C., whereby a polyolefin resin composition was prepared, and a test specimen and a square plate were prepared therefrom.

Physical properties of the specimens as measured are shown in Table 1.

As is clear from the results shown in Table 1, the composition prepared was excellent in impact strength, rigidity, heat resistance, glossiness and oil resistance.

Subsequently, a specimen for transmission electron microscopic observation was prepared in the same manner as in Example 1. On observation of the specimen under a transmission electron microscope, it was found that spherical or elliptical dispersed particles having an average particle diameter of not more than 1 μm are present in the specimen.

EXAMPLE 3

Example 1 was repeated except that the proportions of the cycloolefin random copolymer, graft modified cycloolefin random copolymer and graft modified elastomer used were changed to those as shown in Table 1, whereby a polyolefin resin composition was prepared, and a test specimen and a square plate were prepared therefrom.

Physical properties of the specimens obtained are shown in Table 1.

As is clear from the results shown in Table 1, the composition prepared was excellent in impact strength, rigidity, heat resistance, glossiness and oil resistance.

Subsequently, a specimen for transmission electron microscopic observation was prepared in the same manner as in Example 1. On observation of the specimen under a transmission electron microscope, it was found that spherical or elliptical dispersed particles having an average particle diameter of not more than 1 μm are present in the specimen.

EXAMPLE 4-5

Example 1 was repeated except that the proportions of the cycloolefin random copolymer (PO-1), graft modified cycloolefin random copolymer (GPO-2) and graft modified elastomer (MP-1) used were changed to those as shown in Table 1, whereby polyolefin resin compositions were prepared, and test specimens and square plates were prepared therefrom.

Physical properties of the specimens obtained are shown in Table 1.

As is clear from the results shown in Table 1, the compositions obtained were excellent in impact strength, rigidity, heat resistance, glossiness and oil resistance.

Subsequently, specimens for transmission electron microscopic observation were prepared in the same manner as in Example 1. On observation of the specimens under a transmission electron microscope, it was found that spherical or elliptical dispersed particles having an average particle diameter of not more than 1 μm are present in the specimens.

EXAMPLE 6

Example 4 was repeated except that "MP-2" was used in place of the "MP-1", whereby a polyolefin resin composition was prepared, and a test specimen and a square plate were prepared therefrom.

Physical properties of the specimens obtained are shown in Table 1.

As is clear from the results shown in Table 1, the composition prepared was excellent in impact strength, rigidity, heat resistance, glossiness and oil resistance.

Subsequently, a specimen for transmission electron microscopic observation was prepared in the same manner as in Example 1. On observation of the specimen under a transmission electron microscope, it was found that spherical or elliptical dispersed particles having an average particle diameter of not more than 1 μm are present in the specimen.

EXAMPLE 7

Example 1 was repeated except that the proportions of the resins used were changed to those as shown in Table 1, whereby a polyolefin resin composition was prepared, and a test specimen and a square plate were prepared therefrom.

Physical properties of the specimens obtained are shown in Table 1.

The composition thus obtained was excellent in impact strength, rigidity and heat resistance, though the composition did not show distinguished oil resistance.

Subsequently, a specimen for transmission electron microscopic observation was prepared in the same manner as in Example 1. On observation of the specimen under a transmission electron microscope, it was found that spherical or elliptical dispersed particles having an average particle diameter of not more than 1 μm are present in the specimen.

EXAMPLE 8

Example 7 was repeated except that the proportion of the cycloolefin random copolymer (PO-2) and graft modified elastomer (MP-1) used were changed to those as shown in Table 1, whereby a polyolefin resin composition was prepared, and a test specimen and a square plate were prepared therefrom.

Physical properties of the specimens obtained are shown in Table 1.

The composition thus obtained was excellent in impact strength, rigidity and heat resistance, though the composition did not show distinguished oil resistance.

Subsequently, a specimen for transmission electron microscopic observation was prepared in the same manner as in Example 1. On observation of the specimen under a transmission electron microscope, it was found that spherical or elliptical dispersed particles having an average particle diameter of not more than 1 μm are present in the specimen.

EXAMPLE 9

Example 8 was repeated except that the cycloolefin random copolymer (PO-2) was not used, and the graft modified cycloolefin random copolymer (GPO-3) n substitution for the GPO-1 and the graft modified elastomer (MP-1) were used in the amount as shown in Table 1, whereby a polyolefin resin composition was prepared, and a test specimen and a square plate were prepared therefrom.

Physical properties of the specimens obtained are shown in Table 1.

The composition thus obtained was excellent in impact strength, rigidity and heat resistance, though the composition did not show distinguished oil resistance.

Subsequently, a specimen for transmission electron microscopic observation was prepared in the same manner as in Example 1. On observation of the specimen under a transmission electron microscope, it was found that spherical or elliptical dispersed particles having an average particle diameter of not more than 1 μm are present in the specimen.

EXAMPLE 10

Example 1 was repeated except that the cycloolefin random copolymer (PO-2) in substitution for the PO-1 and the graft modified Cycloolefin random copolymer (GPO-1) were used in the amounts as shown in Table 1 and melt kneaded together to form a molten resin composition, and pellet prepared in advance by melt kneading the graft modified elastomer (MP-1) and the polyamide (CM1007) together were side fed to the molten resin composition, whereby a polyolefin resin composition was prepared, and a test specimen and a square plate were prepared therefrom.

Physical properties of the specimens obtained are shown in Table 1.

As evidenced by the thus obtained specimens having the physical properties as shown in Table 1, the resin composition obtained was excellent in oil resistance, impact strength, rigidity and heat resistance.

Subsequently a specimen for transmission electron microscopic observation was prepared in the same manner as in Example 1. On observation of the specimen under a transmission electron microscope, it was found that spherical or elliptical dispersed particles having an average particle diameter of not more than 1 μm are present in the specimen.

EXAMPLE 11

Example 1 was repeated except that the resin components used were changed to those as shown in Table 1, and the components were melt kneaded together in a batch, whereby a polyolefin resin composition was prepared. The test specimens were prepared in the same manner as in Example 1 and were observed under a transmission electron microscope in the same way as in Example 1, whereupon the dispersed particles observed had an average particle diameter of not more than 3 μm.

EXAMPLE 12

Example 3 was repeated except that the resin components used were changed to those as shown in Table 1, and the components were melt kneaded together in a batch, whereby a polyolefin resin composition was prepared. The test specimens were prepared from the polyolefin resin composition in the same manner as in Example 1.

Physical properties of the specimens obtained are shown in Table 1. The specimens thus obtained were observed under a transmission electron microscope in the same manner as in Example 1, whereupon the dispersed particles observed has an average particle diameter of not more than 3 μm.

COMPARATIVE EXAMPLE 1

Example 6 was repeated except that the ethylene/propylene copolymer MP-0 was used instead of the graft modified elastomer, whereby a polyolefin resin composition was obtained.

Physical properties of the test specimens obtained from the polyolefin composition are shown in Table 1. The composition thus obtained was poor in impact strength, though the composition was excellent in rigidity, heat resistance and glossiness.

TABLE 1 (1-1)

| | Cycloolefin random copolymer (a-1) | Graft modified cycloolefin random copolymer (b) | Graft modified elastomer (c) | Polyamide (d) | Resin composition (a-1)/(b)/(c)/(d) | Feed method | IZ (kg·cm/cm) | FM (kg/cm²) | MI (g/10 min.) | Gloss (%) | TMA (°C.) | Oil resistance (%) | Water absorption (%) |
|---|---|---|---|---|---|---|---|---|---|---|---|---|---|
| Ex. 1 | PO-1 | GPO-1 | MP-1 | CM1007 | 30/10/10/50 | Side feed | 44 | 22100 | 10.4 | 95 | 189 | +0.2 | +0.8 |
| Ex. 2 | PO-1 | GPO-1 | MP-1 | CM3001-N | 30/10/10/50 | Side feed | 30 | 22300 | — | 47 | 223 | +0.1 | — |
| Ex. 3 | PO-1 | GPO-1 | MP-1 | CM1007 | 25/10/15/50 | Side feed | 61 | 19700 | 10.0 | 96 | 188 | +1.6 | +0.8 |
| Ex. 4 | PO-2 | GPO-2 | MP-1 | CM1007 | 30/10/10/50 | Side feed | 30 | 24400 | 8.5 | 91 | 191 | +0.2 | +0.8 |
| Ex. 5 | PO-2 | GPO-2 | MP-1 | CM1007 | 20/20/10/50 | Side feed | 30 | 25000 | 7.0 | 90 | 192 | +0.2 | +0.8 |
| Ex. 6 | PO-2 | GPO-2 | MP-2 | CM1007 | 30/10/10/50 | Side feed | 30 | 24300 | 9.3 | 86 | 191 | +0.2 | +0.8 |
| Ex. 7 | PO-1 | GPO-1 | MP-1 | CM1007 | 35/10/15/40 | Side feed | 46 | 20600 | 9.4 | 93 | 148 | +4.6 | — |
| Ex. 8 | PO-2 | GPO-1 | MP-1 | CM1007 | 35/10/15/40 | Side feed | 60 | 18700 | 8.1 | 79 | 164 | +4.3 | +0.8 |
| Ex. 9 | — | GPO-3 | MP-1 | CM1007 | 0/40/10/50 | Side feed | 30 | 23800 | 13.0 | 92 | 195 | +0.5 | +0.8 |
| Ex. 10 | PO-2 | GPO-1 | MP-1 | CM1007 | 30/10/10/50 | Side feed | 24 | 22000 | 8.5 | 89 | 179 | +0.3 | +0.8 |
| Ex. 11 | PO-1 | GPO-1 | MP-1 | CM1007 | 20/20/15/45 | batch feed | 31 | 18300 | 0.1 | 70 | 184 | — | +0.4 |
| Ex. 12 | PO-1 | GPO-1 | MP-1 | CM1007 | 25/10/15/50 | batch feed | 50 | 19000 | 11.0 | 85 | 178 | +4.5 | +0.9 |
| Comparative Ex. 1 | PO-2 | GPO-2 | Graft unmodified MP-0 | CM1007 | 30/10/10/50 | Side feed | 6 | 22000 | 12.2 | 90 | 180 | +1.8 | +0.8 |

What is claimed is:

1. A polyolefin resin composition containing
   (a) at least one cycloolefin resin selected from the group consisting of
      (a-1) a copolymer of ethylene and cycloolefin represented by the following formula (I),
      (a-2) a ring opening homopolymer of cycloolefin represented by the following formula (I),
      (a-3) a ring opening copolymer of at least two different cycloolefins represented by the following formula (I), and
      (a-4) a hydrogenation product of the above-mentioned (a-2) or (a3),
   (b) a graft modification product of the above-mentioned (a-1), (a-2), (a-3) or (a-4) with an unsaturated carboxylic acid or a derivative thereof,
   (c) an α-olefin copolymer graft modified with an unsaturated carboxylic acid or a derivative thereof and having a tensile modulus at 23° C. of 0.1–2000 kg/cm², and
   (d) polyamide, said components (a), (b), (c) and (d) amounting, based on 100 parts by weight of the composition, to 0–59.5 parts by weight, 0.5–60 parts by weight, 2–30 parts by weight and 20–60 parts by weight, respectively;

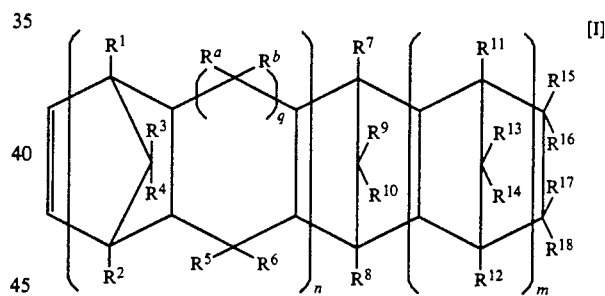

wherein n is 0 or 1, m is 0 to 3, q is 0 or 1, $R^1$ to $R^{18}$, $R^a$ and $R^b$ independently represent an atom or a group selected from the group consisting of hydrogen atom, halogen atom and hydrocarbon group, wherein the hydrocarbon group is selected from the group consisting of alkyl containing 1 to 6 carbon atoms and cycloalkyl containing 3 to 6 carbon atoms, $R^{15}$ to $R^{18}$ may be bonded together to form a monocyclic group or a polycyclic group which optionally has one or more double bonds.

2. The polyolefin resin composition as claimed in claim 1 wherein the polyolefin resin composition is a resin composition formed from the cycloolefin resin (a) which is the copolymer (a-1) of ethylene and cycloolefin of the above-mentioned formula (I) and the graft modification product (b) which is the graft modified of said copolymer (a-1), the graft modified α-olefin copolymer (c) and the polyamide (d) totaling to 100 parts by weight, said components (a-1), (b), (c) and (d) amounting to greater than 0 up to 59.5 parts by weight, 0.5–60 parts by weight, 2–30 parts by weight and 20–60 parts by weight, respectively.

3. The polyolefin resin composition as claimed in claim 1 or 2 wherein the component (a-1) has a softening temperature of 70°–250° C. and an intrinsic viscosity [η], as measured in decalin at 130° C., of 0.3–2.0 dl/g.

4. The polyolefin resin composition as claimed in claim 1 or 2 wherein the component (b) has a softening temperature of 0°–250° C. and an intrinsic viscosity [η], as measured in decalin at 130° C., of 0.1–2.0 dl/g.

5. The polyolefin resin composition as claimed in claim 1 or 2 wherein the graft modified α-olefin copolymer (c) is a graft modification product of an amorphous or low crystalline elastomeric α-olefin copolymer formed from two kinds of α-olefins.

6. The polyolefin resin composition as claimed in claim 1 or 2 wherein the graft modification product (b) of the component (a-1), (a-2), (a-3) or (a-4) is a product graft modified with maleic anhydride.

7. The polyolefin resin composition as claimed in claim 1 or 2 wherein the graft modified α-olefin copolymer (c) is a product graft modified with maleic anhydride.

8. A process for the preparation of a polyolefin resin composition which comprises melt kneading
   (a) at least one cycloolefin resin selected from the group consisting of
      (a-1) a copolymer of ethylene and cycloolefin represented by the following formula (I),
      (a-2) a ring opening homopolymer of cycloolefin represented by the following formula (I),
      (a-3) a ring opening copolymer of at least two different cycloolefins represented by the following formula (I), and
      (a-4) a hydrogenation product of the above-mentioned (a-2) or (a-3)
   (b) a graft modification product of the above-mentioned (a-1), (a-2), (a-3) or (a-4) with an unsaturated carboxylic acid or a derivative thereof,
   (c) an α-olefin copolymer graft modified with an unsaturated carboxylic acid or a derivative thereof and having a tensile modulus at 23° C. of 0.1–2000 kg/cm², and
   (d) polyamide all together;

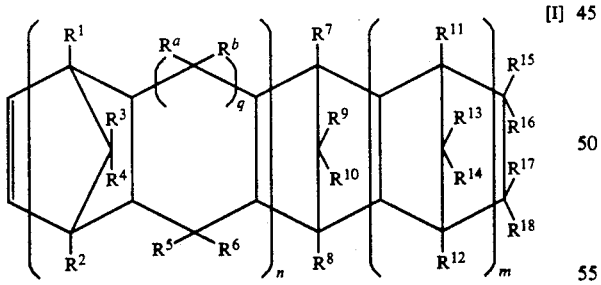

wherein n is 0 or 1, m is 0 to 3, q is 0 or 1, $R^1$ to $R^{18}$, $R^a$ and $R^b$ independently represent an atom or a group selected from the group consisting of hydrogen atom, halogen atom and hydrocarbon group, wherein the hydrocarbon group is selected from the group consisting of alkyl containing 1 to 6 carbon atoms and cycloalkyl containing 3 to 6 carbon atoms, $R^{15}$ to $R^{18}$ may be bonded together to form a monocyclic group or a polycyclic group which optionally has one or more double bonds.

9. A process for the preparation of a polyolefin resin composition which comprises melt kneading
   (a) at least one cycloolefin resin selected from the group consisting of
      (a-1) a copolymer of ethylene and cycloolefin represented by the following formula (I),
      (a-2) a ring opening homopolymer of cycloolefin represented by the following formula (I),
      (a-3) a ring opening copolymer of at least two different cycloolefins represented by the following formula (I), and
      (a-4) a hydrogenation product of the above-mentioned (a-2) or (a-3),
   (b) a graft modification product of the above-mentioned (a-1), (a-2), (a-3) or (a-4) with an unsaturated carboxylic acid or a derivative thereof, and
   (c) an α-olefin copolymer graft modified with an unsaturated carboxylic acid or a derivative thereof and having a tensile modulus at 23° C. of 0.1–2000 kg/cm², and adding
   (d) polyamide to the kneaded product obtained in a molten state, followed by kneading the resulting mixture;

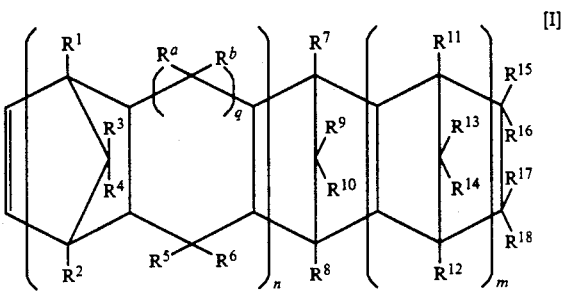

wherein n is 0 or 1, m is 0 to 3, q is 0 or 1, $R^1$ to $R^{18}$, $R^a$ and $R^b$ independently represent an atom or a group selected from the group consisting of hydrogen atom, halogen atom and hydrocarbon group, wherein the hydrocarbon group is selected from the group consisting of alkyl containing 1 to 6 carbon atoms and cycloalkyl containing 3 to 6 carbon atoms, $R^{15}$ to $R^{18}$ may be bonded together to form a monocyclic group or a polycyclic group which optionally has one or more double bonds.

10. The process for the preparation of a polyolefin resin composition as claimed in claim 9 wherein the polyamide (d) is added in a solid state to the molten resin stream of the components (a), (b) and (c).

11. A polyolefin resin composition containing
   (a) at least one cycloolefin resin selected from the group consisting of
      (a-1) a copolymer of ethylene and cycloolefin represented by the following formula (I),
      (a-2) a ring opening homopolymer of cycloolefin represented by the following formula (I),
      (a-3) a ring opening copolymer comprising two different cycloolefins represented by the following formula (I), and
      (a-4) a hydrogenation product of the above-mentioned (a-2) or (a-3)
   (b) a graft modification product of the above-mentioned (a-1), (a-2), (a-3) or (a-4) with an unsaturated carboxylic acid or a derivative thereof, and
   (c) an α-olefin copolymer graft modified with an unsaturated carboxylic acid or a derivative thereof and having a tensile modulus at 23° C. of 0.1–2000 kg/cm², and (d) polyamide, said components (a), (b), (c) and (d) amounting, based on 100 parts by weight of the composition, to 0 to 40 parts by weight, 0.5–55 parts by weight, 5–30 parts by weight and 25–60 parts by weight, respectively;

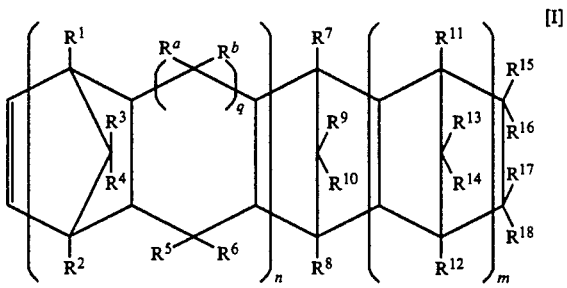

wherein n is 0 or 1, m is 0 to 3, q is 0 or 1, $R^1$ to $R^{18}$, $R^a$ and $R^b$ independently represent an atom or a group selected from the group consisting of hydrogen atom, halogen atom and hydrocarbon group, wherein the hydrocarbon group is selected from the group consisting of alkyl containing 1 to 6 carbon atoms and cycloalkyl containing 3 to 6 carbon atoms, $R^{15}$ to $R^{18}$ may be bonded together to form a monocyclic group or a polycyclic group which optionally has one or more double bonds.

12. The polyolefin resin composition as claimed in claim 11 wherein the polyolefin resin composition is a resin composition formed from the cycloolefin resin (a) which is the copolymer (a-1) of ethylene and cycloolefin of the above-mentioned formula (I) and the graft modification product (b) which is the graft modified of said copolymer (a-1), the graft modified α-olefin copolymer (c) and the polyamide (d) totaling to 100 parts by weight, said components (a-1), (b), (c) and (d) amounting to greater than 0 up to 40 parts by weight, 0.5–55 parts by weight, 5–30 parts by weight and 30–55 parts by weight, respectively.

13. The polyolefin resin composition as claimed in claim 11 wherein the polyolefin resin composition is a resin composition formed from the cycloolefin resin (a) which is the ring opening homopolymer (a-2) of cycloolefin of the above-mentioned formula (I) and the graft modification product (b) which is the graft modified of said homopolymer (a-2), the graft modified α-olefin copolymer (c) and the polyamide (d) totaling to 100 parts by weight, said components (a-2), (b), (c) and (d) amounting to greater than 0 up to 40 parts by weight, 0.5–55 parts by weight, 5–30 parts by weight and 30–55 parts by weight, respectively.

14. The polyolefin resin composition as claimed in claim 11 wherein the polyolefin resin composition is a resin composition formed from the cycloolefin resin (a) which is the ring opening copolymer (a-3) comprising two different cycloolefins of the above-mentioned formula (I) and the graft modification product (b) which is the graft modified of said copolymer (a-3), the graft modified α-olefin copolymer and the polyamide (d) totaling to 100 parts by weight, said components (a-3), (b), (c) and (d) amounting to greater than 0 up to 40 parts by weight, 0.5–55 parts by weight, 5–30 parts by weight and 30–55 parts by weight, respectively.

15. The polyolefin resin composition as claimed in claim 11, 12, 13 or 14 wherein the graft modification α-olefin copolymer (c) is a graft modification product of an amorphous or low crystalline elastomeric α-olefin copolymer comprising two different α-olefins.

16. The polyolefin resin composition as claimed in claim 11, 12, 13 or 14 wherein the graft modification product (b) of the component (a-1), (a-2), (a-3) or (a-4) is a product graft modified with maleic anhydride.

17. The polyolefin resin composition of claim 1 or 11 wherein in the formula (I) n=1.

18. The polyolefin resin composition of claim 1 or 11 wherein in the formula (I) m=1 to 3.

19. The process of claim 8 or 9 for the preparation of a polyolefin resin wherein in the formula (I) n=1.

20. The process of claim 8 or 9 for the preparation of a polyolefin resin wherein in the formula (I) m=1 to 3.

* * * * *